United States Patent
Chen et al.

(10) Patent No.: US 8,976,871 B2
(45) Date of Patent: Mar. 10, 2015

(54) MEDIA EXTRACTOR TRACKS FOR FILE FORMAT TRACK SELECTION

(75) Inventors: Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 581 days.

(21) Appl. No.: 12/785,851

(22) Filed: May 24, 2010

(65) Prior Publication Data

US 2011/0064146 A1 Mar. 17, 2011

Related U.S. Application Data

(60) Provisional application No. 61/243,030, filed on Sep. 16, 2009, provisional application No. 61/244,827, filed on Sep. 22, 2009, provisional application No. 61/293,961, filed on Jan. 11, 2010, provisional application No. 61/295,261, filed on Jan. 15, 2010.

(51) Int. Cl.
*H04N 7/12* (2006.01)
*H04N 19/31* (2014.01)
(Continued)

(52) U.S. Cl.
CPC ..... *H04N 19/0043* (2013.01); *H04N 19/00769* (2013.01); *H04N 21/234327* (2013.01);
(Continued)

(58) Field of Classification Search
CPC .............. H04N 19/0043; H04N 19/00769; H04N 19/00781; H04N 19/00884; H04N 21/234327; H04N 21/8451; H04N 21/85406
USPC ........................................ 375/240.26, 240.25
See application file for complete search history.

(56) References Cited

U.S. PATENT DOCUMENTS 7,613,727 B2 11/2009 Visharam et al.
8,483,282 B2 7/2013 Karczewicz et al.
(Continued)

FOREIGN PATENT DOCUMENTS

CN 101283351 A 10/2008
CN 101317460 A 12/2008
(Continued)

OTHER PUBLICATIONS

Amon P. et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/TCSVT.2007.905521.
Anthony Vetro et al., "Extractors in the MVC file format", 88, MPEG Meeting, Apr. 20-24, 2009, Maui, (Motion Picture Expert Group or ISO/IEC JTC1/SC29/WG11), Apr. 17, 2009, XP030044958.
Grineberg, et al., "Deliverable D3.2 MVC/SVC storage format" Jan. 29, 2009, XP002599508 Retrieved from the Internet: URL:http://www.ist-sea.eu/Public/SEA_D3.2_HHI FF_20090129.pdf [retrieved on Sep. 1, 2010] paragraph [02.3].
International Search Report and Written Opinion—PCT/US2010/049402, ISA/EPO—Apr. 27, 2010.
(Continued)

*Primary Examiner* — Anner Holder
(74) *Attorney, Agent, or Firm* — Brent A. Boyd

(57) ABSTRACT

A video coding apparatus may be configured to utilize media extractors in a media extractor track that reference two or more non-consecutive network access layer (NAL) units of a separate track. An example apparatus includes a multiplexer to construct a first track including a video sample comprising NAL units, based on encoded video data, wherein the video sample is included in an access unit, construct a second track including an extractor that identifies at least first one of the NAL units in the video sample of the first track, and wherein the extractor identifies a second NAL unit of the access unit, wherein the first identified NAL unit and the second identified NAL unit are non-consecutive, and include the first track and the second track in a video file conforming at least in part to ISO base media file format. The identified NAL units may be in separate tracks.

46 Claims, 22 Drawing Sheets

(51) Int. Cl.
*H04N 19/597* (2014.01)
*H04N 21/2343* (2011.01)
*H04N 21/845* (2011.01)
*H04N 21/854* (2011.01)
*H04N 19/70* (2014.01)
*H04N 19/61* (2014.01)

(52) U.S. Cl.
CPC ..... *H04N21/8451* (2013.01); *H04N 21/85406* (2013.01); *H04N 19/00884* (2013.01); *H04N 19/00781* (2013.01)
USPC .............................. 375/240.26; 375/240.25

(56) References Cited

U.S. PATENT DOCUMENTS

| | | | |
|---|---|---|---|
| 2005/0190774 A1* | 9/2005 | Wiegand ................. | 370/395.64 |
| 2006/0156363 A1 | 7/2006 | Wu et al. | |
| 2007/0022215 A1* | 1/2007 | Singer et al. ................. | 709/246 |
| 2007/0098083 A1 | 5/2007 | Visharam et al. | |
| 2007/0186005 A1 | 8/2007 | Setlur et al. | |
| 2007/0201832 A1* | 8/2007 | Date et al. ..................... | 386/95 |
| 2009/0003439 A1 | 1/2009 | Wang et al. | |
| 2009/0055417 A1 | 2/2009 | Hannuksela | |
| 2010/0153395 A1* | 6/2010 | Hannuksela et al. ......... | 707/737 |
| 2010/0189182 A1* | 7/2010 | Hannuksela ............. | 375/240.25 |
| 2011/0082945 A1* | 4/2011 | Myers et al. ................. | 709/231 |

FOREIGN PATENT DOCUMENTS

| | | |
|---|---|---|
| JP | 2009503950 A | 1/2009 |
| JP | 2011528868 A | 11/2011 |
| KR | 20040088541 A | 10/2004 |
| KR | 20040106414 A | 12/2004 |
| KR | 20080082192 A | 9/2008 |
| KR | 20090084875 A | 8/2009 |
| WO | WO2007012062 A1 | 1/2007 |
| WO | 2009049260 | 4/2009 |
| WO | 2010007513 A1 | 1/2010 |

OTHER PUBLICATIONS

Ying Chen et al., "Comments on FPDAM4 of MPEG-2 Systems: Transport of MVC", 89, MPEG Meeting, Jun. 29, 2009-Jul. 3, 2009, London, (Motion Picture Expert Group or ISO/IEC JTC1/SC29/WG11), Jun. 25, 2009, XP030045329.

Frojdh et al., "ISO/IEC JTC1/SC29/WG11: Coding of Moving Pictures and Audio," ISO/IEC JTC1/SC29/WG11, MPEG2009/M16665, Jul. 2009, London, UK, 14 pp.

ISO/IEC, "Information Technology—Coding of Audio-Visual Objects—Part 12: ISO base media file format," ISO/IEC 14496-12:2008(E), 3d edition, Oct. 15, 2008, 120 pp.

Third Generation Partnership Project Technical Specification Group, "Transparent end-to-end Packet-switched Streaming Service (PSS): Protocols and Codecs," 3GPP TS 26.234, version 9.1.0, Release 9, Dec. 2009, Valbonne, FR, 180 pp.

3GPP, "Transparent end-to-end packet switched streaming service (PSS): 3GPP file format (3GP)." ETSI TS 126 244, 3GPP TS 26.244, version 9.0.0, Release 9, Sophia Antipolis, FR, 54 pp.

Sullivan et al., Document: JVT-AA007, "Editor's Draft Revision to ITU-T Rec. H.264 | ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.

Vetro et al., Document: JVT-AB204 (rev. 1), "Joint Draft 8.0 on Multiview Video Coding," Joint Video Team (JVT) of ISO/IEC MPEG & ITU-T VCEG(ISO/IEC JTC1/SC29/WG11 and ITU-T SG16 Q.6), 28th Meeting: Hannover, DE, Jul. 20-25, 2008, pp. 1-66, http://wftp3.itu.int/av-arch/jvt-site/2008_07_Hannover/JVT-AB204.zip.

Schwarz et al, "Overview of the Scalable Video Coding Extension of the H.264/AVC Standard," IEEE Transactions on Circuits and Systems for Video Technology, vol. 17, No. 9, Sep. 2007, pp. 1103-1120.

Taiwan Search Report—TW099132093—TIPO—Apr. 8, 2014.

* cited by examiner

MEDIA EXTRACTOR TRACKS FOR FILE FORMAT TRACK SELECTION

This application claims the benefit of U.S. Provisional Application Nos. 61/243,030, filed Sep. 16, 2009, 61/244,827, filed Sep. 22, 2009, 61/293,961, filed Jan. 11, 2010, and 61/295,261, filed Jan. 15, 2010, the entire contents of each of which are incorporated herein by reference.

TECHNICAL FIELD

This disclosure relates to the transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized by a multiplexer for transmission or storage. MPEG-2 includes a "Systems" section that defines a transport level for many video encoding standards. MPEG-2 transport level systems may be used by MPEG-2 video encoders, or other video encoders conforming to different video encoding standards. For example, MPEG-4 prescribes different encoding and decoding methodologies than those of MPEG-2, but video encoders implementing the techniques of the MPEG-4 standard may still utilize the MPEG-2 transport level methodologies. In general, references to "MPEG-2 systems" refer to the transport level of video data prescribed by MPEG-2. The transport level prescribed by MPEG-2 is also referred to in this disclosure as an "MPEG-2 transport stream" or simply a "transport stream." Likewise, the transport level of MPEG-2 systems also includes program streams. Transport streams and program streams generally include different formats for delivering similar data, where a transport stream comprises one or more "programs" including both audio and video data, while program streams include one program including both audio and video data.

Efforts have been made to develop new video coding standards based on H.264/AVC. One such standard is the scalable video coding (SVC) standard, which is the scalable extension to H.264/AVC. Anther standard is the multi-view video coding (MVC), which becomes the multiview extension to H.264/AVC. The MPEG-2 Systems specification describes how compressed multimedia (video and audio) data streams may be multiplexed together with other data to form a single data stream suitable for digital transmission or storage. The latest specification of MPEG-2 systems is specified in "Information Technology—Generic Coding of Moving Pictures and Associated Audio: Systems, Recommendation H.222.0; International Organisation for Standardisation, ISO/IEC JTC1/SC29/WG11; Coding of Moving Pictures and Associated Audio," May 2006. MPEG recently designed the transport standard of MVC over MPEG-2 systems and the latest version of this specification is "Study of ISO/IEC 13818-1: 2007/FPDAM4 Transport of MVC", MPEG doc. N10572, MPEG of ISO/IEC JTC1/SC29/WG11, Maui, Hi., USA, April 2009.

The latest joint draft of MVC is in described in JVT-AB204, "Joint Draft 8.0 on Multiview Video Coding," 28$^{th}$ JVT meeting, Hannover, Germany, July 2008, available at http://wftp3.itu.int/av-arch/jvt-site/2008_07_Hannover/JVT-AB204.zip. A later version integrated into the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30$^{th}$ JVT meeting, Geneva, CH, February 2009, available at http://wftp3.itu.int/av-arch/jvt-site/2009_01_Geneva/JVT-AD007.zip.

SUMMARY

In general, this disclosure describes techniques for using media extractors in multi-track video data formats to form a media extractor track. This disclosure modifies the International Organization for Standardization (ISO) base media format to utilize an extractor that is capable of referencing one or more potentially non-consecutive network access layer (NAL) units. Such an extractor may be present in any track of an ISO base media format file. This disclosure also describes modifications to the Third Generation Partnership Project (3GPP) file format to include a frame rate value as an attribute of a track selection box. This disclosure further describes, with respect to the multiview video coding (MVC) extension to the ISO base media format, use of the extractor to support efficient extraction of MVC operation points.

In one example, a method for encoding video data includes constructing, by a source video device, a first track including a video sample comprising a plurality of network access layer (NAL) units based on encoded video data, wherein the video sample is included in an access unit, constructing, by the source video device, a second track including an extractor that identifies at least one of the plurality of NAL units in the video sample of the first track, the at least one of the plurality of NAL units comprising a first identified NAL unit, and wherein the extractor identifies a second NAL unit of the access unit, wherein the first identified NAL unit and the second identified NAL unit are non-consecutive, including the first track and the second track in a video file conforming at least in part to International Organization for Standardization (ISO) base media file format, and outputting the video file.

In another example, an apparatus for encoding video data includes an encoder configured to encode video data, a multiplexer configured to construct a first track including a video sample comprising a plurality of network access layer (NAL) units, based on the encoded video data, wherein the video sample is included in an access unit, construct a second track including an extractor that identifies at least one of the plurality of NAL units in the video sample of the first track, the at least one of the plurality of NAL units comprising a first identified NAL unit and wherein the extractor identifies a second NAL unit of the access unit, wherein the first identified NAL unit and the second identified NAL unit are non-consecutive, include the first track and the second track in a video file conforming at least in part to International Organization for Standardization (ISO) base media file format, and an output interface configured to output the video file.

In another example, an apparatus for encoding video data includes means for constructing a first track including a video sample comprising a plurality of network access layer (NAL) units based on encoded video data, wherein the video sample is included in an access unit, means for constructing a second track including an extractor that identifies at least one of the plurality of NAL units in the video sample of the first track, the at least one of the plurality NAL units comprising a first identified NAL unit, and wherein the extractor identifies a second NAL unit of the access unit, wherein the first identified NAL unit and the second NAL unit are non-consecutive, means for including the first track and the second track in a video file conforming at least in part to International Organization for Standardization (ISO) base media file format, and means for outputting the video file.

In another example, a computer-readable storage medium comprises instructions that, when executed, cause a processor of a source device to construct a first track including a video sample a plurality of network access layer (NAL) units based on encoded video data, wherein the video sample is included in an access unit, construct a second track including an extractor that identifies at least one of the plurality of NAL units in the video sample of the first track, the at least one of the plurality of NAL units comprising a first identified NAL unit, and wherein the extractor identifies a second NAL unit of the access unit, wherein the first identified NAL unit and the second identified NAL unit are non-consecutive, include the first track and the second track in a video file conforming at least in part to International Organization for Standardization (ISO) base media file format, and output the video file.

In another example, a method for decoding video data includes receiving, by a demultiplexer of a destination device, a video file conforming at least in part to International Organization for Standardization (ISO) base media file format, the video file comprising a first track and a second track, the first track including a video sample comprising a plurality of network access layer (NAL) units corresponding to encoded video data, wherein the video sample is included in an access unit, and the second track including an extractor that identifies at least one of the plurality of NAL units of the first track, the at least one of the plurality of NAL units comprising a first identified NAL unit, and wherein the extractor identifies a second NAL unit of the access unit, wherein the first identified NAL unit and the second identified NAL unit are non-consecutive, selecting the second track to be decoded, and sending encoded video data of the first NAL unit and the second NAL unit identified by the extractor of the second track to a video decoder of the destination device.

In another example, an apparatus for decoding video data includes a video decoder configured to decode video data, and a demultiplexer configured to receive a video file conforming at least in part to International Organization for Standardization (ISO) base media file format, the video file comprising a first track and a second track, the first track including a video sample comprising a plurality of network access layer (NAL) units corresponding to encoded video data, wherein the video sample is included in an access unit, and the second track including an extractor that identifies at least one of the plurality of NAL units of the first track, the at least one of the plurality of NAL units comprising a first identified NAL unit, and wherein the extractor identifies a second NAL unit of the access unit, wherein the first identified NAL unit and the second identified NAL unit are non-consecutive, select the second track to be decoded, and send encoded video data of the first NAL unit and the second NAL unit identified by the extractor of the second track to the video decoder.

In another example, an apparatus for decoding video data includes means for receiving, by a demultiplexer of a destination device, a video file conforming at least in part to International Organization for Standardization (ISO) base media file format, the video file comprising a first track and a second track, the first track including video sample comprising a plurality of network access layer (NAL) units corresponding to encoded video data, wherein the video sample is included in an access unit, and the second track including an extractor that identifies at least one of the plurality of NAL units of the first track, the at least one of the plurality of NAL units comprising a first identified NAL unit, and wherein the extractor identifies a second NAL unit of the access unit, wherein the first identified NAL unit and the second identified NAL unit are non-consecutive, means for selecting the second track to be decoded, and means for sending encoded video data of the first NAL unit and the second NAL unit identified by the extractor of the second track to a video decoder of the destination device.

In another example, a computer-readable storage medium is encoded with instructions that, when executed, cause a processor of a destination device to, upon receiving a video file conforming at least in part to International Organization for Standardization (ISO) base media file format, the video file comprising a first track and a second track, the first track including a video sample comprising a plurality of network access layer (NAL) units corresponding to encoded video data, wherein the video sample is included in an access unit, and the second track including an extractor that identifies at least one of the plurality of NAL units of the first track, the at least one of the plurality of NAL units comprising a first identified NAL unit, and wherein the extractor identifies a second NAL unit of the access unit, wherein the first identified NAL unit and the second identified NAL unit are non-consecutive, select the second track to be decoded, and send encoded video data of the first NAL unit and the second NAL unit identified by the extractor of the second track to a video decoder.

The details of one or more examples are set forth in the accompanying drawings and the description below. Other features, objects, and advantages will be apparent from the description and drawings, and from the claims.

DETAILED DESCRIPTION

Figure 1:
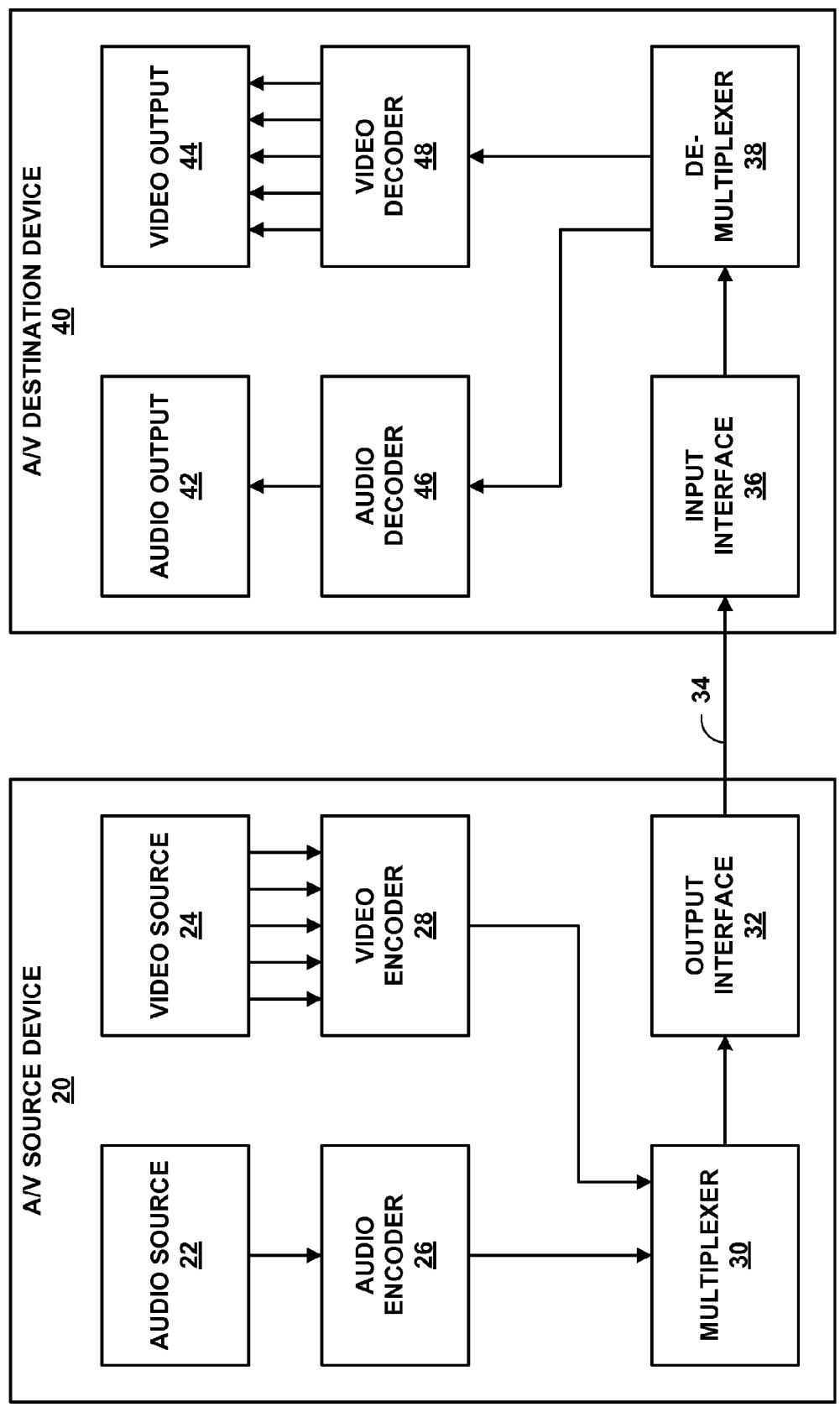
FIG. 1 is a block diagram illustrating an example system in which an audio/video (A/V) source device transports audio and video data to an A/V destination device.

The techniques of this disclosure are generally directed to enhancing the International Organization for Standardization (ISO) base media file format and extensions of the ISO base media file format. Extensions of the ISO base media file format include, for example, advanced video coding (AVC), scalable video coding (SVC), multiview video coding (MVC), and Third Generation Partnership Project (3GPP) file format. In general, the techniques of this disclosure may be used to produce a media extractor track in the ISO base media file format and/or the extensions of the ISO base media file format. As described in greater detail below, such media extractor tracks may be used to support adaptation in hypertext transport protocol (HTTP) video streaming, in some examples. In some examples, a media extractor forms part of the ISO base media file format and/or extensions of the ISO base media file format (e.g., AVC, SVC, MVC, and 3GPP) to extract entire samples of another track to form a new media extractor track.

These techniques may be used by MPEG-2 (Motion Picture Experts Group) systems, that is, systems that conform to MPEG-2 with respect to transport level details. MPEG-4, for example, provides standards for video encoding, but generally assumes that video encoders conforming to the MPEG-4 standard will utilize MPEG-2 transport level systems. Accordingly, the techniques of this disclosure are applicable to video encoders that conform to MPEG-2, MPEG-4, ITU-T H.263, ITU-T H.264/MPEG-4, or any other video encoding standard that utilizes MPEG-2 transport streams and/or program streams.

The ISO base media file format provides for files including one or more tracks. The ISO base media file format standard defines a track as a timed sequence of related samples. The ISO base media file format standard defines a sample as data associated with a single timestamp, and provides examples of a sample as an individual frame of video, a series of video frames in decoding order, or a compressed section of audio in decoding order. Special tracks referred to as hint tracks do not contain media data, but instead contain instructions for packaging one or more tracks into a streaming channel. The ISO base media file format standard notes that in hint tracks, a sample defines the formation of one or more streaming packets.

The techniques of this disclosure provide for creation of media extractor tracks. A media extractor track may generally include one or more extractors. Extractors in a media extractor track are used to identify and extract samples of another track. In this manner, media extractors in a media extractor track may be considered pointers that, when dereferenced, retrieve samples from another track. Unlike extractors of SVC, for example, the extractors of this disclosure can reference one or more potentially non-consecutive network access layer (NAL) units of another track. In accordance with the techniques of this disclosure, media extractor tracks, tracks containing one or more media extractors, and other tracks not including a media extractor can be grouped together to form an alternate group.

This disclosure uses the term "consecutive" with respect to NAL units to describe two or more NAL units that occur in the same track contiguously. That is, the last byte of data in one of the NAL units immediately precedes the first byte of data of another of the NAL units in the same track when the two NAL units are consecutive. Two NAL units in the same access unit are generally considered "non-consecutive" either where the two NAL units are separated by at some amount of data within the same track, or where one NAL unit occurs in one track while the other NAL unit occurs in a different track. The techniques of this disclosure provide an extractor that may identify two or more non-consecutive NAL units of an access unit.

Moreover, the extractors of this disclosure are not limited to SVC, but can be included in the ISO base media file format generally or any other extension of the ISO base media file format, such as, for example, AVC, SVC, or MVC. The extractors of this disclosure can also be included in the Third Generation Partnership Project (3GPP) file format. This disclosure additionally provides for modifying the 3GPP file format to explicitly signal a frame rate as an attribute of a track selection box.

Media extractor tracks may be used in the MVC file format, for example, to support extraction of operation points. A server device may provide various operation points in an MPEG-2 transport layer bitstream, each of which corresponds to a respective subset of particular views of multiview video coding video data. That is, an operation point generally corresponds to a subset of views of a bitstream. In some examples, each view of an operation point includes video data at the same frame rate. In accordance with the techniques of this disclosure, an operation point may be represented using a media extractor track that includes one or more extractors that reference video data of other tracks, and potentially additional samples not included in other tracks.

In this manner, each operation point may include only the necessary NAL units required for decoding the operation point, in order to output a subset of views with a common frame rate. The combination of extractor tracks with the whole representation of the MVC video may form a playlist of MVC representations. Use of the media extractor tracks of this disclosure may support operation point selection and switching, e.g., for operation points with various bitrates resulting from temporal scalability.

The media extractor tracks of this disclosure can also be used to form alternate groups or switch groups. That is, in the ISO base media file format, tracks may be grouped together to form alternate groups. In the example of ISO base media file format, tracks of an alternate group form viable substitutes for each other, such that generally only one of the tracks of an alternate group is played or streamed at any one time. Tracks of an alternate group should be distinguishable from the other tracks of the alternate group, e.g., via attributes such as bitrate, codec, language, packet size, or other characteristics. The techniques of this disclosure provide for grouping media extractor tracks, tracks containing media extractors, and/or other normal video tracks to form an alternate group. In examples conforming to MVC, each track may correspond to a respective operation point. That is, each operation point in MVC may be represented by a particular one of the tracks, e.g., either a media extractor track or a track not including a media extractor. One track in the same alternate group is typically selected for progressive downloading, to adapt to available bandwidth.

Similarly, media extractor tracks and other tracks can be grouped together to form a switch group in 3GPP file format, and can be used for track selection to adapt the bandwidth and decoder capability in HTTP Streaming applications. The 3GPP file format provides a definition of a switch group of tracks. Tracks in a switch group belong to the same alternate group. That is, tracks in the same switch group are available for switching during a session, whereas tracks in different switch groups are not available for switching, in accordance with the 3GPP file format.

FIG. 1 is a block diagram illustrating an example system 10 in which audio/video (A/V) source device 20 transports audio and video data to A/V destination device 40. A/V source device 20 may also be referred to as a "source video device." System 10 of FIG. 1 may correspond to a video teleconference system, a server/client system, a broadcaster/receiver system, or any other system in which video data is sent from a source device, such as A/V source device 20, to a destination device, such as A/V destination device 40. A/V destination device 40 may also be referred to as a "destination video device" or a "client device." In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder, also referred to as a vocoder.

A/V source device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

The techniques of this disclosure are generally directed to the transport of encoded multimedia (e.g., audio and video) data, and reception and subsequent interpretation and decoding of the transported multimedia data. The techniques of this disclosure may be applied to transport of video data of various standards and extensions such as, for example, scalable video coding (SVC), advanced video coding (AVC), OSI base layer, or Multiview Video Coding (MVC) data, or other video data comprising a plurality of views. As shown in the example of FIG. 1, video source 24 may provide a plurality of views of a scene to video encoder 28. Multiple views of video data may be useful for generating three-dimensional video data to be used by a three-dimensional display, such as a stereoscopic or autostereoscopic three-dimensional display.

A/V source device 20 may provide a "service" to A/V destination device 40. A service generally corresponds to a subset of available views of MVC data. For example, multi-view video data may be available for eight views, ordered zero through seven. One service may correspond to stereo video having two views, while another service may correspond to four views, and still another service may correspond to all eight views. In general, a service corresponds to any combination (that is, any subset) of the available views. A service may also correspond to a combination of available views as well as audio data.

A/V source device 20, in accordance with the techniques of this disclosure, is able to provide services that correspond to a subset of views. In general, a view is represented by a view identifier, also referred to as a "view_id." View identifiers generally comprise syntax elements that may be used to identify a view. An MVC encoder provides the view_id of a view when the view is encoded. The view_id may be used by an MVC decoder for inter-view prediction or by other units for other purposes, e.g., for rendering.

Figure 7:
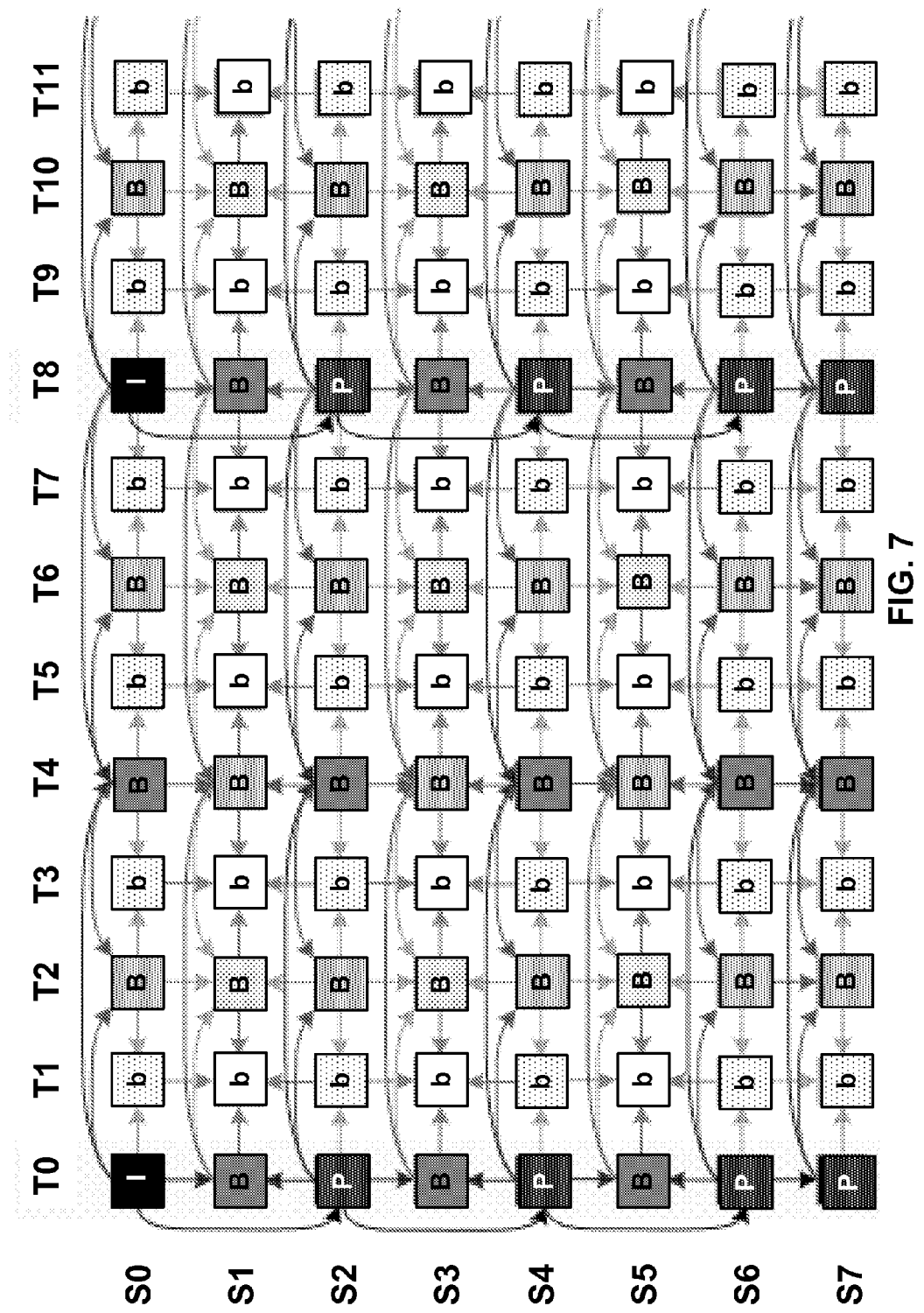
FIG. 7 is a conceptual diagram illustrating an example MVC prediction pattern.

Inter-view prediction is a technique for encoding MVC video data of a frame with reference to one or more frames at a common temporal location as the encoded frame of different views. FIG. 7, which is discussed in greater detail below, provides an example coding scheme for inter-view prediction. In general, an encoded frame of MVC video data may be predictively encoded spatially, temporally, and/or with reference to frames of other views at a common temporal location. Accordingly, reference views, from which other views are predicted, generally are decoded before the views for which the reference views act as reference, so that these decoded views can be used for reference when decoding referential views. The decoding order does not necessarily correspond to the order of the view_ids. Therefore, the decoding order of views is described using view order indexes. View order indexes are indexes that indicate the decoding order of corresponding view components in an access unit.

Each individual stream of data (whether audio or video) is referred to as an elementary stream. An elementary stream is a single, digitally coded (possibly compressed) component of a program. For example, the coded video or audio part of the program can be an elementary stream. An elementary stream may be converted into a packetized elementary stream (PES) before multiplexed into a program stream or transport stream. Within the same program, a stream ID is used to distinguish the PES-packets belonging to one elementary stream from the other. The basic unit of data of an elementary stream is a packetized elementary stream (PES) packet. Thus each view of MVC video data corresponds to respective elementary streams. Similarly, audio data corresponds to one or more respective elementary streams.

An MVC coded video sequence may be separated into several sub-bitstreams, each of which is an elementary stream. Each sub-bitstream may be identified using an MVC view_id subset. Based on the concept of each MVC view_id subset, an MVC video sub-bitstream is defined. An MVC video sub-bitstream contains the NAL units of the views listed in the MVC view_id subset. A program stream generally contains only the NAL units which are from those of the elementary streams. It is also designed that any two elementary streams cannot contain an identical view.

In the example of FIG. 1, multiplexer 30 receives elementary streams comprising video data from video encoder 28 and elementary streams comprising audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, multiplexer 30 may include packetizers for forming PES packets from encoded audio and video data.

A "program," as used in this disclosure, may comprise a combination of audio data and video data, e.g., an audio elementary stream and a subset of available views delivered by a service of A/V source device 20. Each PES packet includes a stream_id that identifies the elementary stream to which the PES packet belongs. Multiplexer 30 may assemble elementary streams into constituent program streams or transport streams. A program stream and a transport stream are two alternative multiplexes targeting different applications.

In general, a program stream includes data for one program, while a transport stream may include data for one or more programs. Multiplexer 30 may encode either or both of a program stream or a transport stream, based on a service being provided, a medium into which the stream will be passed, a number of programs to be sent, or other considerations. For example, when the video data is to be encoded in a storage medium, multiplexer 30 may be more likely to form a program stream, whereas when the video data is to be streamed over a network, broadcast, or sent as part of video telephony, multiplexer 30 may be more likely to use a transport stream.

Multiplexer 30 may be biased in favor of using a program stream for the storage and display of a single program from a digital storage service. A program stream is intended for use in error-free environments or environments less susceptible to encountering errors, because program streams are rather susceptible to errors. A program stream simply comprises the elementary streams belonging to it and usually contains packets of variable lengths. In a program stream, PES-packets that are derived from the contributing elementary streams are organized into "packs." A pack comprises a pack-header, an optional system-header, and any number of PES-packets taken from any of the contributing elementary streams, in any order. The system header contains a summary of the characteristics of the program stream such as its maximum data rate, the number of contributing video and audio elementary streams, further timing information, or other information. A decoder may use the information contained in a system header to determine whether or not the decoder is capable of decoding the program stream.

Multiplexer 30 may use a transport stream for the simultaneous delivery of a plurality of programs over potentially error-prone channels. A transport stream is a multiplex devised for multi-program applications such as broadcasting, so that a single transport stream can accommodate many independent programs. A transport stream comprises a succession of transport packets, each of the transport packets being 188-bytes long. The use of short, fixed length packets means that the transport stream is less susceptible to errors than the program stream. Further, each 188-byte-long transport packet may be given additional error protection by processing the packet through a standard error protection process, such as Reed-Solomon encoding. The improved error resilience of the transport stream means that it has a better chance of surviving the error-prone channels to be found in a broadcast environment, for example.

It might seem that the transport stream is, the better of the two multiplexes with its increased error resilience and ability to carry many simultaneous programs. However, the transport stream is a more sophisticated multiplex than the program stream and is consequently more difficult to create and to demultiplex. The first byte of a transport packet is a synchronization byte having a value of 0×47 (hexadecimal 47, binary '01000111,' decimal 71). A single transport stream may carry many different programs, each program comprising many packetized elementary streams. Multiplexer 30 may use a thirteen-bit Packet Identifier (PID) field to distinguish transport packets containing the data of one elementary stream from those carrying the data of other elementary streams. It is the responsibility of the multiplexer to ensure that each elementary stream is awarded a unique PID value. The last byte of a transport packet is the continuity count field. Multiplexer 30 increments the value of the continuity count field between successive transport packets belonging to the same elementary stream. This enables a decoder or other unit of a destination device, such as A/V destination device 40, to detect the loss or gain of a transport packet and hopefully conceal the errors that might otherwise result from such an event.

Multiplexer 30 receives PES packets for elementary streams of a program from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units contain the core compression engine and may comprise block, macroblock, and/or slice levels. Other NAL units are non-VCL NAL units.

Multiplexer 30 may form NAL units comprising a header that identifies a program to which the NAL belongs, as well as a payload, e.g., audio data, video data, or data that describes the transport or program stream to which the NAL unit corresponds. For example, in H.264/AVC, a NAL unit may include a one-byte header and a payload of varying size. In one example, a NAL unit header comprises a priority_id element, a temporal_id element, an anchor_pic_flag element, a view_id element, a non_idr_flag element, and an inter_view_flag element. In conventional MVC, the NAL unit defined by H.264 is retained, except for prefix NAL units and MVC coded slice NAL units, which include a 4-byte MVC NAL unit header and the NAL unit payload.

The priority_id element of an NAL header may be used for a simple one-path bitstream adaptation process. The temporal_id element may be used for specifying the temporal level of the corresponding NAL unit, where different temporal levels correspond to different frame rates.

The anchor_pic_flag element may indicate whether a picture is an anchor picture or non-anchor picture. Anchor pictures and all the pictures succeeding it in the output order (that is, the display order) can be correctly decoded without decoding of previous pictures in the decoding order (that is, the bitstream order), and thus can be used as random access points. Anchor pictures and non-anchor pictures can have different dependencies, both of which are signaled in the sequence parameter set. Other flags are to be discussed and used in the following sections of this chapter. Such an anchor picture may also be referred to as an open GOP (Group Of Pictures) access point, while a close GOP access point is also supported when the non_idr_flag element is equal to zero. The non_idr_flag element indicates whether a picture is an instantaneous decoder refresh (IDR) or view IDR (V-IDR) picture. In general, an IDR picture, and all the pictures succeeding it in output order or bitstream order, can be correctly decoded without decoding of previous pictures in either decoding order or display order.

The view_id element comprises syntax information that may be used to identify a view, which may be used for data interactivity inside an MVC decoder, e.g., for inter-view prediction, and outside a decoder, e.g., for rendering. The inter_view_flag element may specify whether the corresponding NAL unit is used by other views for inter-view prediction. To convey the 4-byte NAL unit header information for a base view, which may be compliant to AVC, a prefix NAL unit is defined in MVC. In the context of MVC, the base view access unit includes the VCL NAL units of the current time instance of the view as well as its prefix NAL unit, which contains only the NAL unit head. An H.264/AVC decoder may ignore the prefix NAL unit.

A NAL unit including video data in its payload may comprise various granularity levels of video data. For example, a NAL unit may comprise a block of video data, a macroblock, a plurality of macroblocks, a slice of video data, or an entire frame of video data.

In general, an access unit may comprise one or more NAL units for representing a frame of video data, as well audio data corresponding to the frame when such audio data is available. An access unit generally includes all NAL units for one output time instance, e.g., all audio and video data for one time instance. In an example corresponding to H.264/AVC, an access unit may comprise a coded picture in one time instance, which may be presented as a primary coded picture. Accordingly, an access unit may comprise all video frames of a common temporal instance, e.g., all view components corresponding to time X.

This disclosure also refers to an encoded picture of a particular view as a "view component." That is, a view component comprises an encoded picture (or frame) for a particular view at a particular time. Accordingly, an access unit may, in some examples, comprise all view components of a common temporal instance. The decoding order of access units need not necessarily be the same as the output or display order. A set of consecutive access units may form a coded video sequence, which may correspond to a group of pictures (GOP) or other independently decodable unit of a NAL unit bitstream or sub-bitstream.

As with most video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC and is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

The techniques of this disclosure involve including extractors in media extractor tracks. The extractors of this disclosure may reference two or more NAL units of another track in a common file. That is, a file may include a first track having a plurality of NAL units, and a second track including an extractor that identifies two or more of the plurality of NAL units of the first track. In general, an extractor may act as a pointer, such that when the extractor is encountered by demultiplexer 38, demultiplexer 38 may retrieve the NAL units identified by the extractor from the first track and send those NAL units to video decoder 48. A track including an extractor may be referred to as a media extractor track. The extractors of this disclosure may be included in files conforming to various file formats, e.g., ISO base media file format, Scalable Video Coding (SVC) file format, Advanced Video Coding (AVC) file format, Third Generation Partnership Project (3GPP) file format, and/or Multiview Video Coding (MVC) file format.

In general, the various tracks of a video file may be used as switch tracks. That is, multiplexer 30 may include various tracks to support various frame rates, display capabilities, and/or decoding capabilities. For example, when the video file conforms to MVC file format, each track may represent a different MVC operation point. Accordingly, demultiplexer 38 may be configured to select one of the tracks from which to retrieve NAL units and discard data of other tracks, other than NAL units identified by extractors of the selected track. That is, when the selected track includes an extractor that references NAL units of another track, demultiplexer 38 may extract the referenced NAL units while discarding non-referenced NAL units of the other track. Demultiplexer 38 may send the extracted NAL units to video decoder 48.

By using extractors in a media extractor track, the techniques of this disclosure may be used to achieve temporal scalability between various tracks of a video file. In MPEG-1 and MPEG-2, for example, B-encoded pictures provide a natural temporal scalability. A first track of a video file conforming to MPEG-1 or MPEG-2 may include a full set of I-encoded pictures, P-encoded pictures, and B-encoded pictures. A second track of the video file may include one or more extractors that reference only the I-encoded pictures and the P-encoded pictures of the first track, omitting references to the B-encoded pictures. By dropping the B-encoded pictures, the video file may achieve a confirming half resolution video representation. MPEG-1 and MPEG-2 also provide a base layer and enhancement layer concept to code two temporal layers, wherein the enhancement layer pictures can choose, for each prediction direction, a picture either from the base layer or the enhancement layer as a reference.

As another example, H.264/AVC uses hierarchical B-encoded pictures to support temporal scalability. The first picture of a video sequence in H.264/AVC may be referred to as an Instantaneous Decoder Refresh (IDR) picture, also known as a key picture. Key pictures are typically coded in regular or irregular intervals, which are either Intra-coded or Inter-coded using a previous key picture as reference for motion compensated prediction. A Group of Pictures (GOP) generally includes a key picture and all pictures which are temporally located between the key picture and a previous key picture. A GOP can be divided into two parts, one is the key picture, and the other includes non-key pictures. The non-key pictures are hierarchically predicted by 2 reference pictures, which are the nearest pictures of the lower temporal level from the past and the future. A temporal identifier value may be assigned to each picture to indicate a hierarchical position of the picture. Thus pictures with temporal identifier values up to N may form a video segment with twice the frame rate of that of a video segment formed by pictures with temporal identifier values up to N-1. Accordingly, the techniques of this disclosure may also be used to achieve temporal scalability in H.264/AVC by having a first track including all NAL units with temporal identifier values up to N, and a second track including one or more extractors that reference NAL units of the first track with temporal identifier values up to N-1.

As noted above, the techniques of this disclosure may be applied to video files conforming to any of ISO base media file format, Scalable Video Coding (SVC) file format, Advanced Video Coding (AVC) file format, Third Generation Partnership Project (3GPP) file format, and/or Multiview Video Coding (MVC) file format. The ISO Base Media File Format is designed to contain timed media information for a presentation in a flexible, extensible format that facilitates interchange, management, editing, and presentation of the media. ISO Base Media File format (ISO/IEC 14496-12: 2004) is specified in MPEG-4 Part-12, which defines a general structure for time-based media files. It is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure is object-oriented. A file can be decomposed into basic objects very simply and the structure of the objects is implied from their type.

Files conforming to the ISO base media file format are formed as a series of objects, called "boxes." Data in the ISO base media file format is contained in boxes and there is no other data within the file. This includes any initial signature required by the specific file format. The "box" is an object-oriented building block defined by a unique type identifier and length. Typically, a presentation is contained in one file, and the media presentation is self-contained. The movie container (movie box) contains the metadata of the media and the video and audio frames are contained in the media data container and could be in other files.

A presentation (motion sequence) may be contained in several files. All timing and framing (position and size) information is generally in the ISO base media file and the ancillary files may essentially use any format. This presentation may be 'local' to the system containing the presentation, or may be via a network or other stream delivery mechanism.

The files may have a logical structure, a time structure, and a physical structure, and these structures are not required to be coupled. The logical structure of the file may be of a movie that in turn contains a set of time-parallel tracks. The time structure of the file may be that the tracks contain sequences of samples in time, and those sequences are mapped into the timeline of the overall movie by optional edit lists. The physical structure of the file may separate the data needed for logical, time, and structural decomposition, from the media data samples themselves. This structural information may be concentrated in a movie box, possibly extended in time by movie fragment boxes. The movie box may document the logical and timing relationships of the samples, and may also contain pointers to where they are located. Those pointers may be into the same file or another one, e.g., referenced by a URL.

Each media stream may be contained in a track specialized for that media type (audio, video etc.), and may further be parameterized by a sample entry. The sample entry may contain the 'name' of the exact media type (the type of decoder needed to decode the stream) and any parameterization of that decoder needed. The name may also take the form of a four-character code, e.g., "moov," or "trak." There are defined sample entry formats not only for MPEG-4 media, but also for the media types used by other organizations using this file format family.

Support for meta-data generally takes two forms. First, timed meta-data may be stored in an appropriate track, synchronized as desired with the media data it is describing. Secondly, there may be general support for non-timed meta-data attached to the movie or to an individual track. The structural support is general, and allows, as in the media-data, the storage of meta-data resources elsewhere in the file or in another file. In addition, these resources may be named, and may be protected.

In the ISO base media file format, a sample grouping is an assignment of each of the samples in a track to be a member of one sample group. Samples in a sample group are not required to be contiguous. For example, when presenting H.264/AVC in AVC file format, video samples in one temporal level can be sampled into one sample group. Sample groups may be represented by two data structures: a SampleToGroup box (sbdp) and a SampleGroupDescription box. The SampleToGroup box represents the assignment of samples to sample groups. There may be one instance of the SampleGroupDescription box for each sample group entry, to describe the properties of the corresponding group.

An optional metadata track can be used to tag each track with the "interesting characteristic" that it has, for which its value may differ from other members of the group (e.g., its bit rate, screen size, or language). Some samples within a track may have special characteristics or may be individually identified. One example of the characteristic is the synchronization point (often a video I-frame). These points may be identified by a special table in each track. More generally, the nature of dependencies between track samples can also be documented using metadata. The metadata can be structured as a sequence of file format samples, just like a video track. Such a track may be referred to as a metadata track. Each metadata sample may be structured as a metadata statement. There are various kinds of statement, corresponding to the various questions that might be asked about the corresponding file-format sample or its constituent samples.

When media is delivered over a streaming protocol, the media may need to be transformed from the way it is represented in the file. One example of this is when media is transmitted over the Real Time Protocol (RTP). In the file, for example, each frame of video is stored contiguously as a file-format sample. In RTP, packetization rules specific to the codec used, must be obeyed to place these frames in RTP packets. A streaming server may be configured to calculate such packetization at run-time. However, there is support for the assistance of the streaming servers. Special tracks called hint tracks may be placed in the files.

Hint tracks contain general instructions for streaming servers as to how to form packet streams from media tracks for a specific protocol. Because the form of these instructions is media-independent, servers may not need to be revised when new codecs are introduced. In addition, encoding and editing software can be unaware of streaming servers. Once editing is finished on a file, a piece of software called a hinter may be used to add hint tracks to the file, before placing it on a streaming server. As an example, there is a defined hint track format for RTP streams in the MP4 file format specification.

3GP (3GPP file format) is a multimedia container format defined by the Third Generation Partnership Project (3GPP) for 3G UMTS multimedia services. It is typically used on 3G mobile phones and other 3G capable devices, but can also be played on some 2G and 4G phones and devices. 3GPP file format is based on ISO base media file format. The latest 3GP is specified in 3GPP TS26.244, "Transparent end-to-end packet switched streaming service (PSS); 3GPP file format (3GP)." The 3GPP file format stores video streams as MPEG-4 Part 2 or H.263 or MPEG-4 Part 10 (AVC/H.264). 3GPP allows use of AMR and H.263 codecs in the ISO base media file format (MPEG-4 Part 12), because 3GPP specifies the usage of the Sample Entry and template fields in the ISO base media file format as well as defining new boxes to which codecs refer. For the storage of MPEG-4 media specific information in 3GP files, the 3GP specification refers to MP4 and the AVC file format, which are also based on the ISO base media file format. The MP4 and the AVC file format specifications describe usage of MPEG-4 content in the ISO base media file format.

SVC file format, as an extension of AVC file format, has new structures of extractor and tier. Extractors are pointers that provide information about the position and the size of the video coding data in the sample with equal decoding time in another track. This allows building a track hierarchy directly in the coding domain. An extractor track in SVC is linked to one or more base tracks, from which it extracts data at runtime. An extractor is a dereferenceable pointer with a NAL unit header with SVC extensions. If the track used for extraction contains video coding data at a different frame rate, then the extractor also contains a decoding time offset to ensure synchrony between tracks. At run-time, the extractor has to be replaced by the data to which it points, before the stream is passed to the video decoder.

Because the extractor tracks in SVC are structured like video coding tracks, they may represent the subset they need in different ways. An SVC extractor track contains only instructions on how to extract the data from another track. In SVC file format, there are also aggregators, which can aggregate the NAL unit within a sample together as one NAL unit, including aggregating the NAL units in one layer into an aggregator. The extractor in SVC is designed to extract a certain range of bytes from a sample or an aggregator, or just one entire NAL unit, but not multiple NAL units, especially those that are not consecutive in a sample. In SVC file format, there could be many video operation points. Tiers are designed to group the samples in one or more tracks for an operation point.

MVC file format also supports an extractor track, which extracts the NAL units from different views to form an operation point, which is a subset of views in a certain frame rate. The design of the MVC extractor track is similar to the extractor in SVC file format. However, using the MVC extractor tracks to form an alternate group is not supported. To support track selection, the following MPEG proposal is proposed to MPEG: P. Frojdh, A. Norkin, and C. Priddle, "File format sub-track selection and switching," ISO/IEC JTC1/SC29/

WG11 MPEG M16665, London UK. This proposal tries to enable the alternate/switch group concept in a sub-track level.

A map sample group is an extension to the sample group. In Map sample group, each group entry (of samples) has its description of "groupID," which actually is a map to a view_id, after possibly aggregating NAL units in a view into one NAL unit. In other words, each sample group entry has its containing views listed in the ScalableNALUMapEntry value. The grouping_type of this sample group entry is "scnm."

Progressive download is a term used to describe the transfer of digital media files from a server to a client, typically using the HTTP protocol. When initiated from a computer, the consumer may begin playback of the media before the download is complete. The key difference between streaming media and progressive download is in how the digital media data is received and stored by the end user device that is accessing the digital media. A media player that is capable of progressive download playback relies on metadata located in the header of the file to be intact and a local buffer of the digital media file as it is downloaded from a web server. At the point in which a specified amount of data becomes available to the local playback device, the media will begin to play. This specified amount of buffer is embedded into the file by the producer of the content in the encoder settings and is reinforced by additional buffer settings imposed by the media player.

In 3GPP, HTTP/TCP/IP transport is supported for 3GP files for download and progressive download. Furthermore, using HTTP for video streaming has some advantages, and the video streaming services based on HTTP are getting popular. Some advantages of HTTP streaming include that existing Internet components and protocols may be used, such that new efforts are not needed to develop new techniques for transporting video data over a network. Other transport protocols, e.g., RTP payload format, require intermediate network devices, e.g., middle boxes, to be aware of the media format and the signaling context. Also, HTTP streaming can be client-driven, which avoids many control issues. For example, to exploit all features to obtain optimal performance, the server may keep track of the size and content of packets which are not yet acknowledged. the server may also analyze the file structure and reconstruct the state of the client buffer to make RD-optimal switching/thinning decisions. In addition, constraints on the bit stream variations may be satisfied in order to stay compliant with negotiated profiles. HTTP does not necessarily require new hardware or software implementations at a Web server that has HTTP 1.1 implemented. HTTP streaming also provides TCP-friendliness and firewall traversal. The techniques of this disclosure may improve HTTP streaming of video data to overcome issues related to bandwidth, e.g., by providing bitrate adaptation.

Video compression standards such as ITU-T H.261, H.262, H.263, MPEG-1, MPEG-2 and H.264/MPEG-4 part 10 make use of motion compensated temporal prediction to reduce temporal redundancy. The encoder uses a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). Blocks of P-pictures may be intra-coded or predicted with reference to one other picture. In a B-picture, blocks may be predicted from one or two reference pictures, or may be intra-coded. These reference pictures could be located before or after the current picture in temporal order.

In accordance with the H.264 coding standard, as an example, B-pictures use two lists of previously-coded reference pictures, list 0 and list 1. These two lists can each contain past and/or future coded pictures in temporal order. Blocks in a B-picture may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively. Their combination will be used to predict the current block.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The term macroblock refers to a data structure for encoding picture and/or video data according to a two-dimensional pixel array that comprises 16×16 pixels. Each pixel comprises a chrominance component and a luminance component. Accordingly, the macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra- (I), or inter- (P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

Video encoder 28, video decoder 48, audio encoder 26, audio decoder 46, multiplexer 30, and demultiplexer 38 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined audio encoder/decoder (CODEC). An apparatus including video encoder 28, video decoder 48, audio encoder audio encoder 26, audio decoder 46, multiplexer 30, and/or demultiplexer 38 may comprise an integrated circuit, a microprocessor, and/or a wireless communication device, such as a cellular telephone.

In accordance with the techniques of this disclosure, multiplexer 30 may assemble NAL units into tracks of a video file conforming to ISO base media file format or a derivative thereof (e.g., SVC, AVC, MVC, or 3GPP), and include a media extractor track that identifies one or more potentially non-consecutive NAL units of another track, and pass the video file to output interface 32. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the NAL unit or access unit to a computer-readable medium 34, for example, a transient medium such as a transmission signal or carrier wave, or a computer-readable storage medium such as a magnetic medium, an optical medium, a memory, or a flash drive.

Input interface 36 retrieves the data from computer-readable medium 34. Input interface 36 may comprise, for example, an optical drive, a magnetic media drive, a USB port, a receiver, a transceiver, or other computer-readable medium interface. Input interface 36 may provide the NAL unit or access unit to demultiplexer 38. Demultiplexer 38 may demultiplex a transport stream or program stream into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Demultiplexer 38 may initially select one of the tracks included in a received video file, and then pass only data of the selected track and data of other tracks referenced by extractors of the selected track to video decoder 48, discarding data of other tracks not referenced by an extractor of the selected track. Audio decoder 46 decodes encoded audio data and sends the decoded audio data to audio output 42, while video decoder 48 decodes encoded video data and sends the decoded video data, which may include a plurality of views of a stream, to video output 44. Video output 44 may comprise a display that uses a plurality of views of a scene, e.g., a stereoscopic or autostereoscopic display that presents each view of a scene simultaneously.

Figure 2:
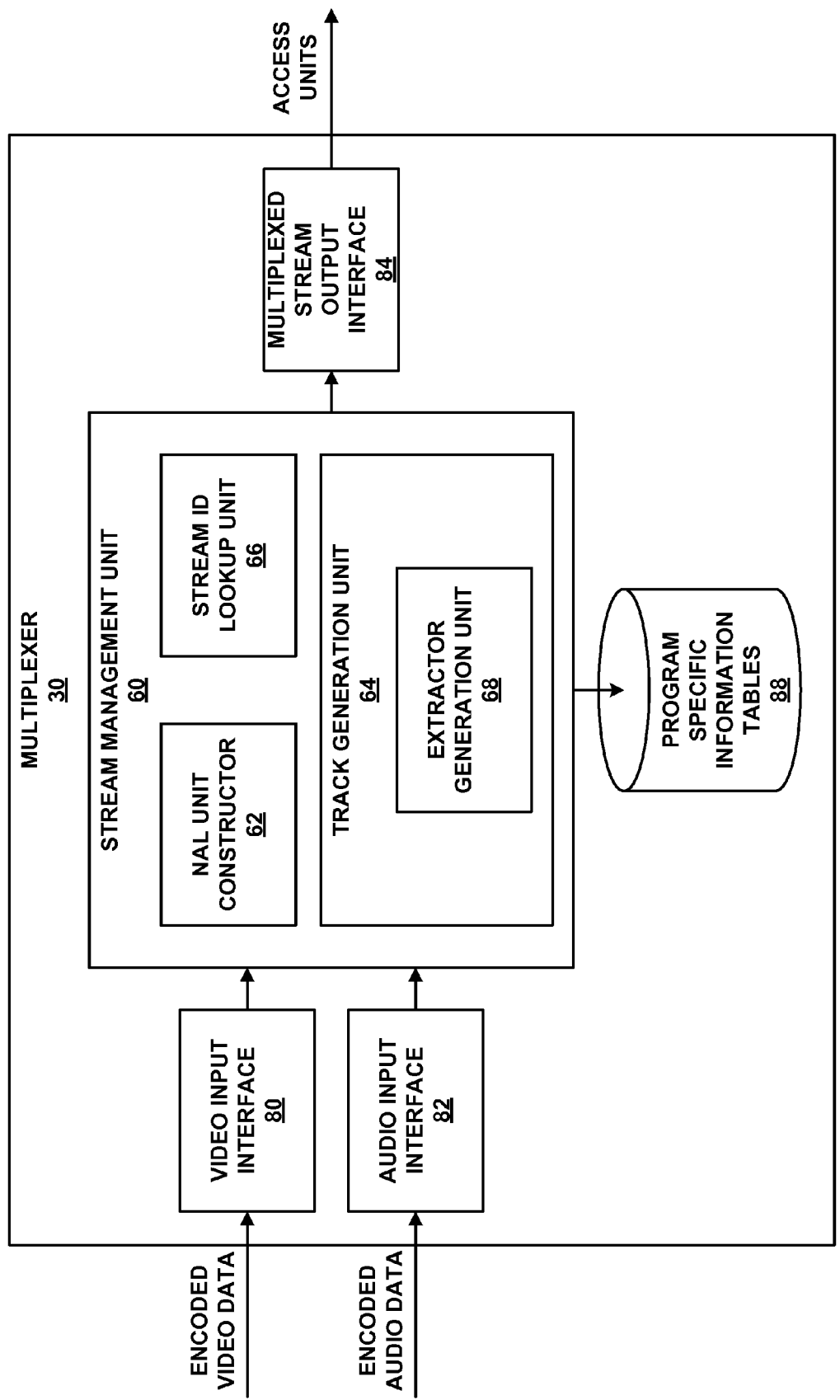
FIG. 2 is a block diagram illustrating an example arrangement of components of a multiplexer.

FIG. 2 is a block diagram illustrating an example arrangement of components of multiplexer 30 (FIG. 1). In the example of FIG. 2, multiplexer 30 includes stream management unit 60, video input interface 80, audio input interface 82, multiplexed stream output interface 84, and program specific information tables 88. Stream management unit 60 includes NAL unit constructor 62, stream identifier (stream ID) lookup unit 66, track generation unit 64, and extractor generation unit 68.

In the example of FIG. 2, video input interface 80 and audio input interface 82 include respective packetizers for forming PES units from encoded video data and encoded audio data. In other examples, video and/or audio packetizers may be present external to multiplexer 30. With respect to the example of FIG. 2, video input interface 80 may form PES packets from encoded video data received from video encoder 28 and audio input interface 82 may form PES packets from encoded audio data received from audio encoder 26.

After NAL unit constructor 62 constructs NAL units, NAL unit constructor 62 sends the NAL units to track generation unit 64. Track generation unit 64 receives NAL units and assembles a video file including the NAL units in one or more tracks of the video file. Track generation unit 64 may further execute extractor generation unit 68 to generate extractors for one or more media extractor tracks constructed by track generation unit 64. When one or more NAL units are determined to belong to multiple tracks, rather than duplicating the NAL unit among the tracks, extractor generation unit 68 may construct an extractor for a track that references the NAL unit. In this manner, multiplexer 30 may avoid duplication of data between tracks, which may reduce bandwidth consumption when transmitting the video file.

Various examples of data structures and components for an extractor are discussed below. In general, an extractor may include a track identifier value that references a track in which a referenced NAL unit is included, and one or more NAL unit identifiers that identify the NAL units referenced by the extractor. In some examples, the NAL unit identifiers may reference a bit or byte range in the track referenced by the track identifier value corresponding to identified NAL units. In some examples, the NAL unit identifiers may individually reference each NAL unit identified by the extractor, e.g., in order to identify non-consecutive NAL units. In some examples, the NAL unit identifiers may reference the NAL units based on an offset from the temporal or spatial location of the extractor in the media extractor track.

Track generation unit 64 may, in some examples, include additional NAL units in a media extractor track. That is, a media extractor track may include both NAL units and extractors. Accordingly, in some examples, track generation unit 64 may construct a video file having a first track that includes only NAL units and a second track that includes one or more extractors that reference all or a subset of the NAL units of the first track. Moreover, in some examples, track generation unit 64 may include additional NAL units in the second track that are not included in the first track. Likewise, the techniques of this disclosure may be extended to a plurality of tracks. For example, track generation unit 64 may construct a third track that may reference NAL units of the first track and/or NAL units of the second track, and may additionally include NAL units not included in the first or second tracks.

Figure 3:
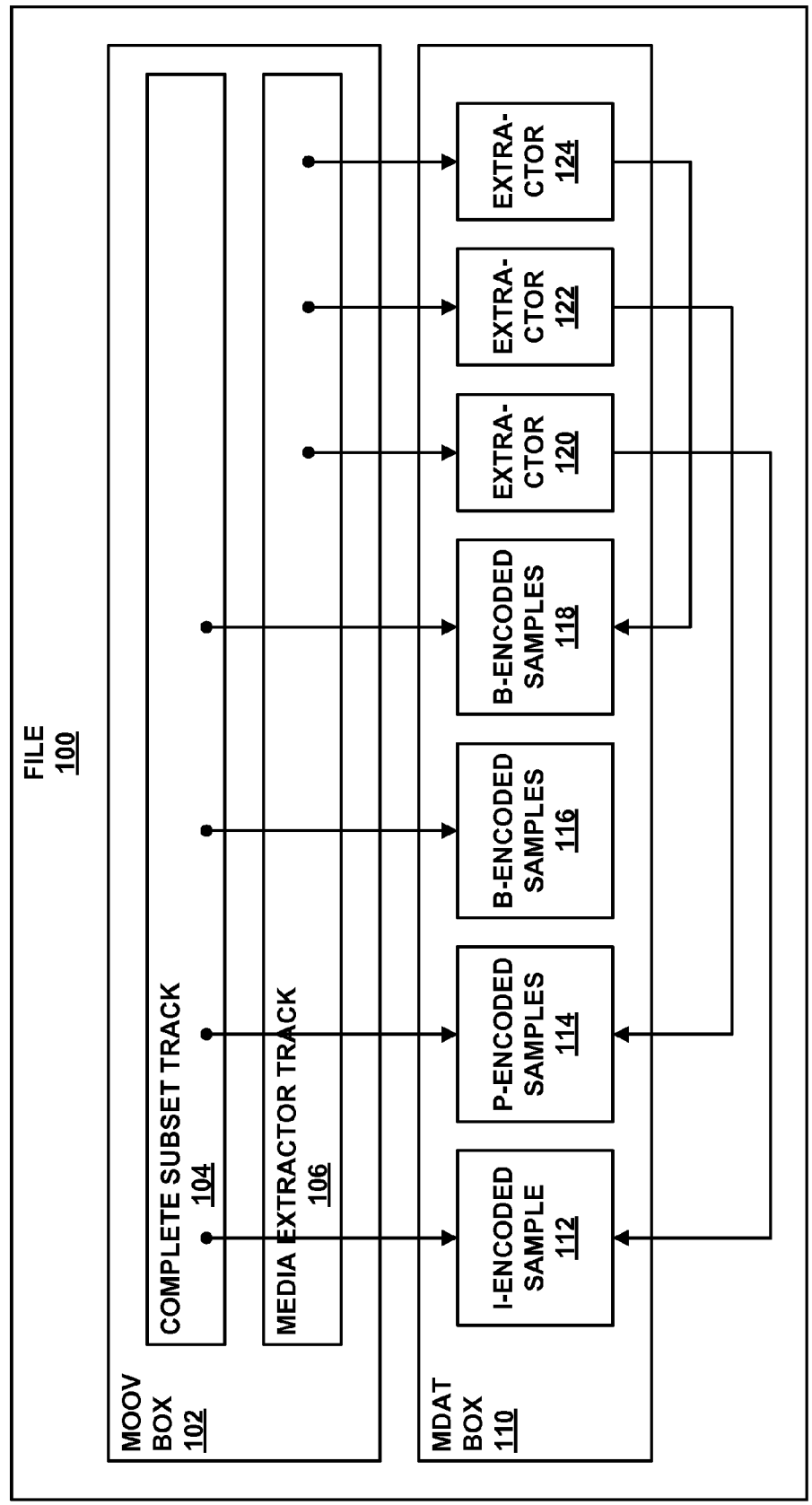
FIG. 3 is a block diagram illustrating an example file including a first track having a set of video samples and a second track having extractors that reference a subset of the video samples of the first track.

FIG. 3 is a block diagram illustrating an example file 100 including a first track having a set of video samples and a second track having extractors that reference a subset of the video samples of the first track. In the example of FIG. 3, file 100 includes MOOV box 102 and media data (MDAT) box 110. MOOV box 102 corresponds to a movie box, which the ISO base media file format defines as a container box whose sub-boxes define the metadata for a presentation. MDAT box 104 corresponds to a media data box, which the ISO base media file format defines as a box which can hold the actual data for a presentation.

In the example of FIG. 3, MOOV box 102 includes complete subset track 104 and media extractor track 106. The ISO base media file format defines a "track" as a timed sequence of related samples in an ISO base media file. The ISO base media file format further notes that for media data, a track corresponds to a sequence of images or sampled audio.

MDAT box 110, in the example of FIG. 3, includes I-encoded sample 112, P-encoded samples 114, B-encoded samples 116, and B-encoded samples 118. B-encoded samples 116 and B-encoded samples 118 are considered to be at different hierarchical encoding levels. In the example of FIG. 3, B-encoded samples 116 may be used as reference for B-encoded samples 118, and therefore, B-encoded samples 118 may be at a hierarchical encoding level that is lower than the hierarchical encoding level of B-encoded samples 116. The display order of the samples may differ from the hierarchical order (also referred to as a decoding order), and the order in which the samples are included in MDAT box 110. For example, I-encoded samples 112 may have a display order value of 0 and a decoding order value of 0, P-encoded samples 114 may have a display order value of 2 and a decoding order value of 1, B-encoded samples 116 may have a display order value of 1 and a decoding order value of 2, and B-encoded samples 118 may have a display order value of 4 and a decoding order value of 3. Track 1 may include additional samples, e.g., a sample with a display order value of 3 and a decoding order value of 4.

Each of I-encoded sample 112, P-encoded samples 114, B-encoded samples 116, and B-encoded samples 118 may correspond to various NAL units or access units. The ISO base media file format defines a "sample" as all the data associated with a single timestamp, e.g., an individual frame of video, a series of video frames in decoding order, or a compressed section of audio in decoding order. Complete subset track 104, in the example of FIG. 3, includes metadata that references I-encoded sample 112, P-encoded samples 114, B-encoded samples 116, and B-encoded samples 118.

MDAT box 110 further includes extractor 120, extractor 122, and extractor 124. Thus extractors 120-124 are included in a movie data box, which would generally include samples of data. In the example of FIG. 3, extractor 120 references I-encoded sample 112, extractor 122 references P-encoded samples 114, and extractor 124 references B-encoded samples 118. There may be two or more NAL units corresponding to I-encoded sample 112, P-encoded samples 114, and/or B-encoded samples 118, and the NAL units may be non-consecutive. In accordance with the techniques of this disclosure, extractors 120-124 may nevertheless identify each of the NAL units of the corresponding sample, even though there may be two or more non-consecutive NAL units in the corresponding sample. Media extractor track 106, in the example of FIG. 3, includes metadata that reference extractor 120, extractor 122, and extractor 124.

Each of extractors 120-124 may also include display order values and decoding order values. For example, extractor 120 may have a display order value of 0 and a decoding order value of 0, extractor 122 may have a display order value of 1 and a decoding order value of 1, and extractor 124 may have a display order value of 2 and a decoding order value of 2. In some examples, the display and/or decoding values may skip certain values, e.g., to match the values of the identified sample.

Complete subset track 104 and media extractor track 106 may form an alternate group, such that demultiplexer 38 (FIG. 1) may select either complete subset track 104 or media extractor track 106 to be decoded by video decoder 48. With respect to the example of MVC, complete subset track 104 may correspond to a first operation point and media extractor track 106 may correspond to a second operation point. With respect to the example of 3GPP, complete subset track 104 and media extractor track 106 may form a switch group. In this manner, complete subset track 104 and media extractor track 106 may be used to adapt bandwidth availability and decoder capability, e.g., in HTTP streaming applications.

When complete subset track 104 is selected, demultiplexer 38 may send samples corresponding to complete subset track 104 (e.g., I-encoded sample 112, P-encoded samples 114, B-encoded samples 116, and B-encoded samples 118) to video decoder 48. When media extractor track 106 is selected, demultiplexer 38 may send samples corresponding to media extractor track 106, including samples identified by media extractors corresponding to media extractor track 106, to video decoder 48. Thus when media extractor track 106 is selected, demultiplexer 38 may send I-encoded sample 112, P-encoded samples 114, and B-encoded samples 118 to video decoder 48, which demultiplexer 38 may retrieve from complete subset track 104 by dereferencing extractor 120, extractor 122, and extractor 124.

Figure 4:
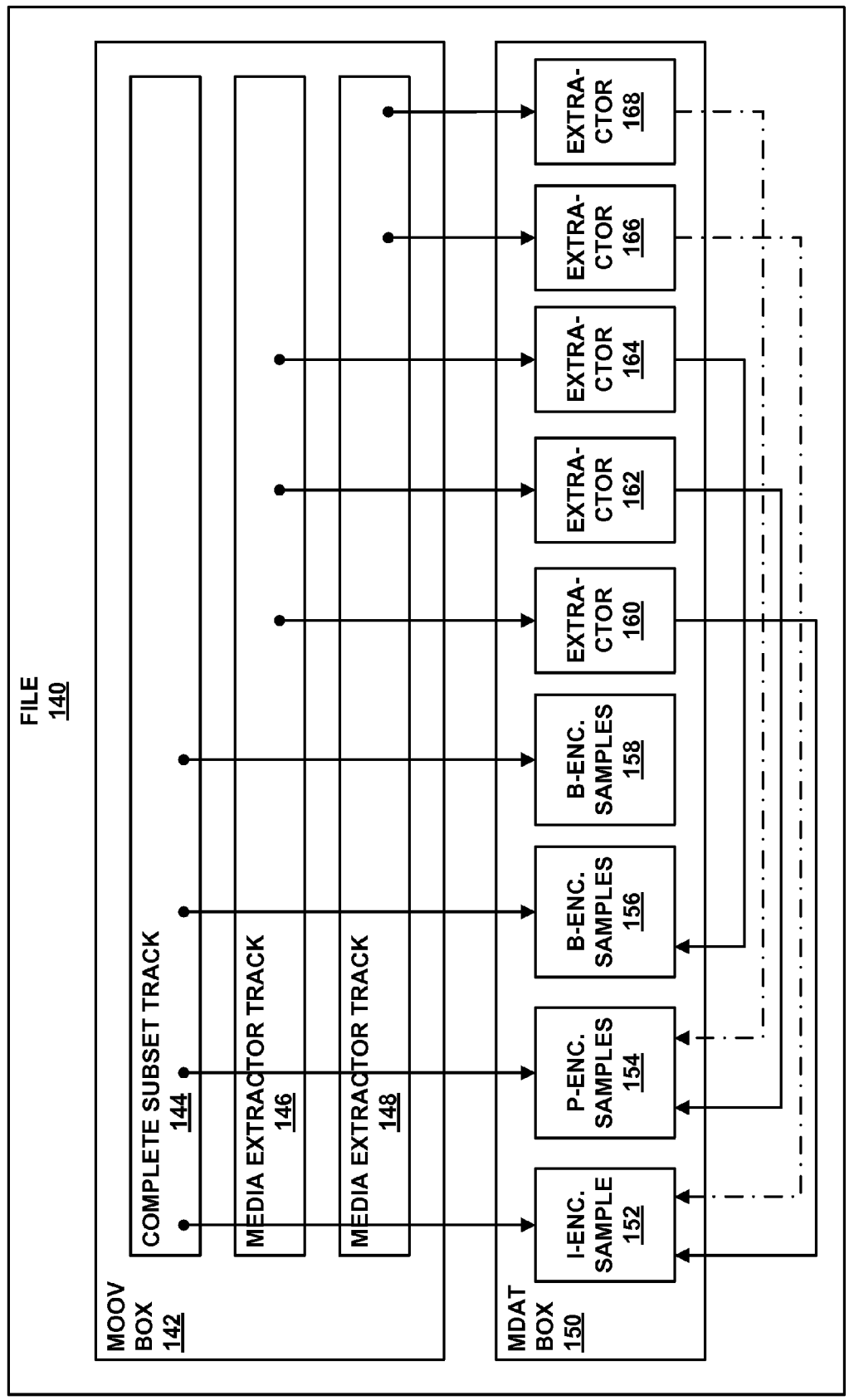
FIG. 4 is a block diagram illustrating another example file that includes two distinct extractor tracks.

FIG. 4 is a block diagram illustrating another example file 140 that includes two distinct extractor tracks 146, 148. Although two extractor tracks are illustrated in the example of FIG. 4, in general, a file may include any number of extractor tracks. In the example of FIG. 4, file 140 includes MOOV box 142 and MDAT box 150. MOOV box 142 includes complete subset track 144 and media extractor tracks 146, 148. MDAT box 150 includes samples of data and extractors for the various tracks, e.g., I-encoded sample 152, P-encoded samples 154, B-encoded samples 156, B-encoded samples 158, and extractors 160-168.

In the example of FIG. 4, extractors 160-164 correspond to media extractor track 146, while extractors 166-168 correspond to media extractor track 148. In this example, extractor 160 of media extractor track 146 identifies I-encoded samples 152, extractor 162 identifies P-encoded samples 154, and extractor 164 identifies B-encoded samples 156. In this example, extractor 166 identifies I-encoded samples 152, while extractor 162 identifies P-encoded samples 154. The example of FIG. 4 demonstrates an example in which two or more extractors of various media extractor track refer to the same sample of a complete subset track.

Media extractor tracks may be used to represent temporal subsets of a video stream, which is decodable and an alternate/switch track of the track containing the original, full temporal resolution bitstream, e.g., complete subset track 144. Complete subset track 144 may, for example, represent a 30 frames-per-second (FPS) video stream. In some examples, by not including a certain hierarchical level of B-pictures in a sub-bitstream, the framerate of the sub-bitstream may be halved or reduced by some other fraction. For example, media extractor track 146, by not including B-encoded samples 158, may have a framerate that is halved, relative to complete subset track 144. For example, media extractor track 146 may have a framerate of 15 FPS. Likewise, media extractor track 148 may have a framerate that is halved relative to media extractor track 146 by omitting both B-encoded samples 156 and B-encoded samples 158, and thus have a framerate of 7.5 FPS.

Figure 5:
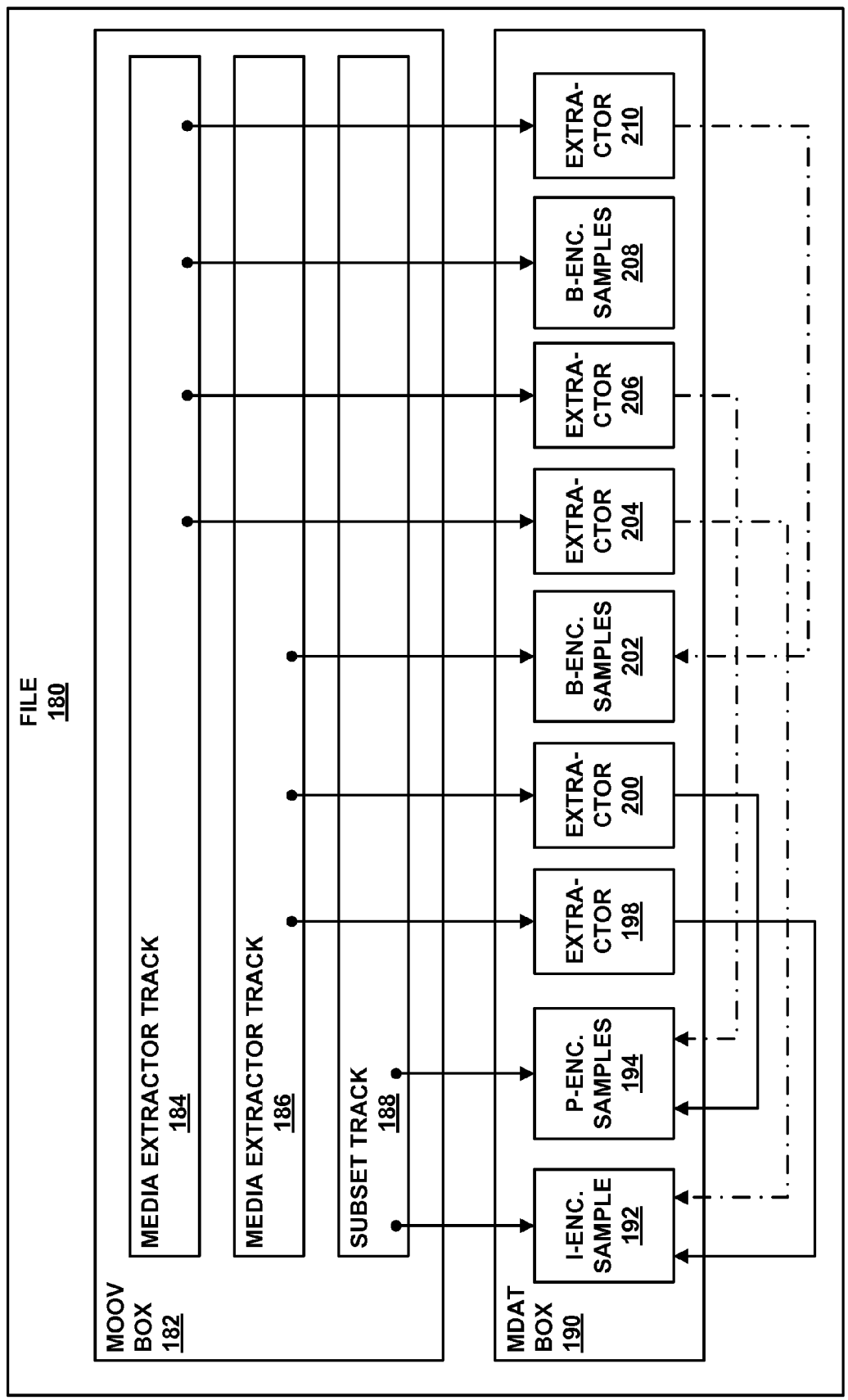
FIG. 5 is a block diagram illustrating another example file including a subset track and two media extractor tracks.

FIG. 5 is a block diagram illustrating another example file 180 including a subset track 188 and two media extractor tracks 184, 186. MOOV box 182 of file 180 includes subset track 188 media extractor tracks 184, 186, while MDAT box 190 includes I-encoded sample 192, P-encoded samples 194, B-encoded samples 202, B-encoded samples 208, and extractors 198, 200, 204, 206 and 210.

As discussed above, a media extractor track may include extractors that refer to samples of another track. In addition, a media extractor track may further include additional video samples that are not included in another track. In the example of FIG. 5, subset track 188 includes I-encoded sample 192, and P-encoded samples 194. Media extractor track 186 includes extractors 198, 200, and additionally includes B-encoded samples 202. Similarly, media extractor track 184 includes extractors 204, 206, 210 and additionally B-encoded samples 208.

In the example of FIG. 5, media extractor track 186 includes encoded samples of video data (B-encoded samples 202), and media extractor track 184 includes extractor 210 that refers to the samples of media extractor track 186 including the encoded samples. That is, in the example of FIG. 5, extractor 210 refers to B-encoded samples 202. Accordingly, media extractor track 184 may represent a full temporal resolution of a bitstream, while media extractor track 186 and subset track 188 may represent subsets of the full temporal resolution bitstream. That is, media extractor track 186 and subset track 188 may have lower temporal resolutions (e.g., lower framerates) than the full temporal resolution represented by media extractor track 184.

In accordance with the techniques of this disclosure, the H.264/AVC file format can be modified to include extractor tracks that can be extracted as any conforming temporal subset of the track containing the original full temporal resolution bitstream. For H.264/AVC that supports hierarchical B (or P) picture coding, assuming there are N temporal levels, each sub-bitstream including samples from temporal level 0 to k (k<N) can be extracted by defining the corresponding extractor track. Thus, for the same video, there could be N tracks (including N-1 extractor tracks) that form an alternate/switch group. The extractors can be associated with a temporal hierarchical level corresponding to the temporal hierarchical level of the samples identified by the extractors. For example, a temporal identifier value specifying the temporal level of the samples may also be signaled in the extractor.

Figure 6A:
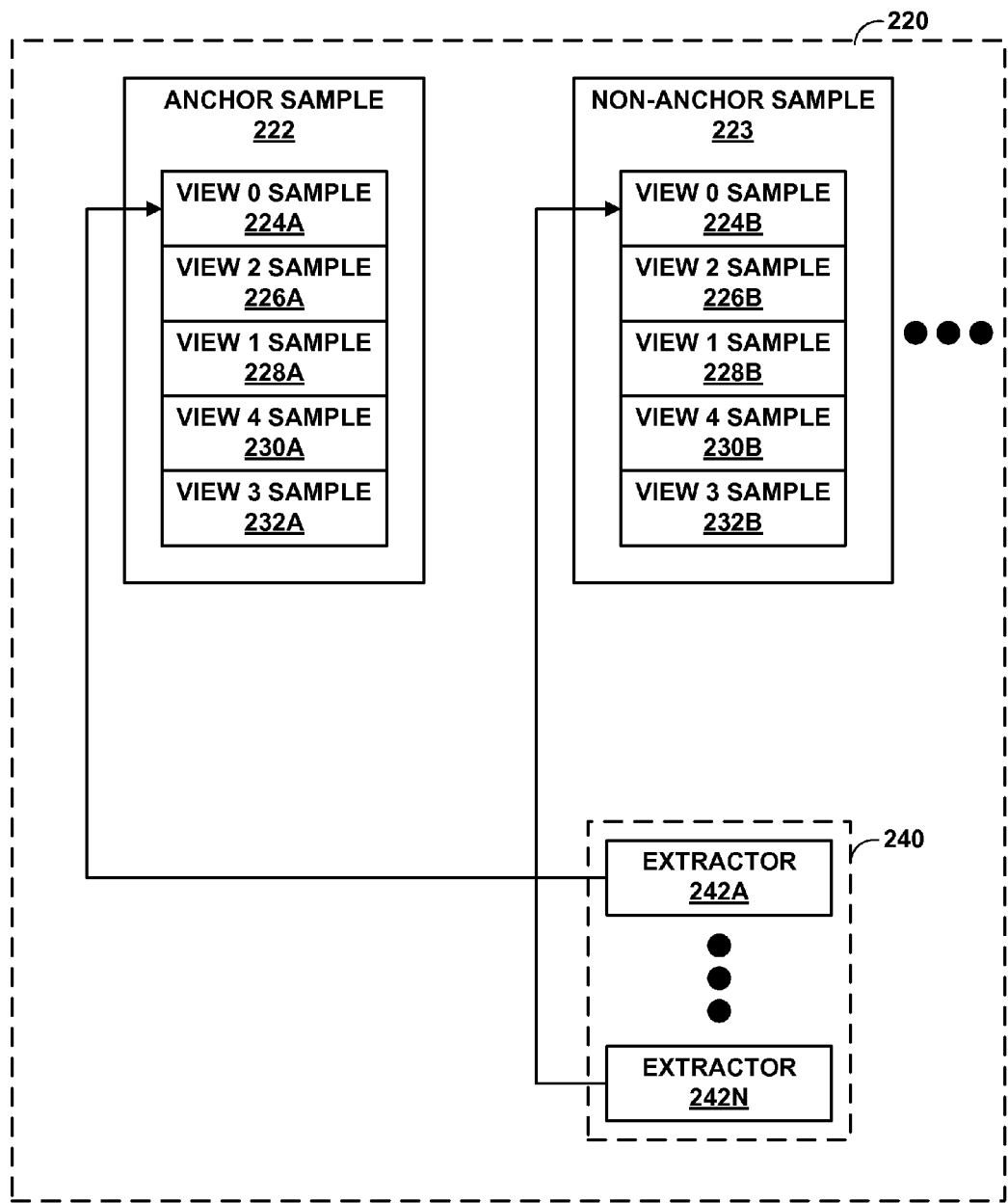
FIGS. 6A-6C are block diagrams illustrating examples of a media data box of a file that includes examples of media extractors for various media extractor tracks.
Figure 6B:
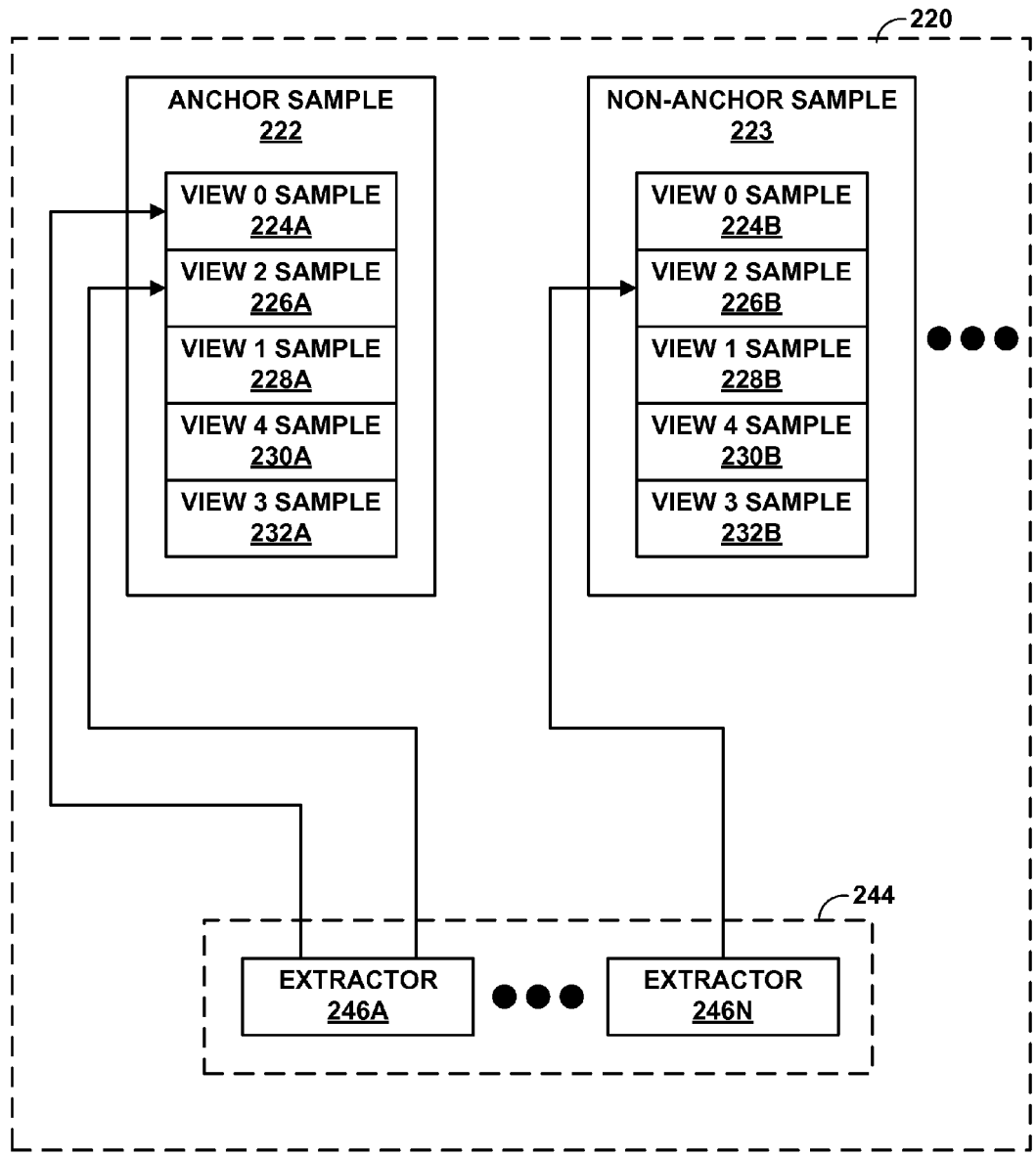
Figure 6C:
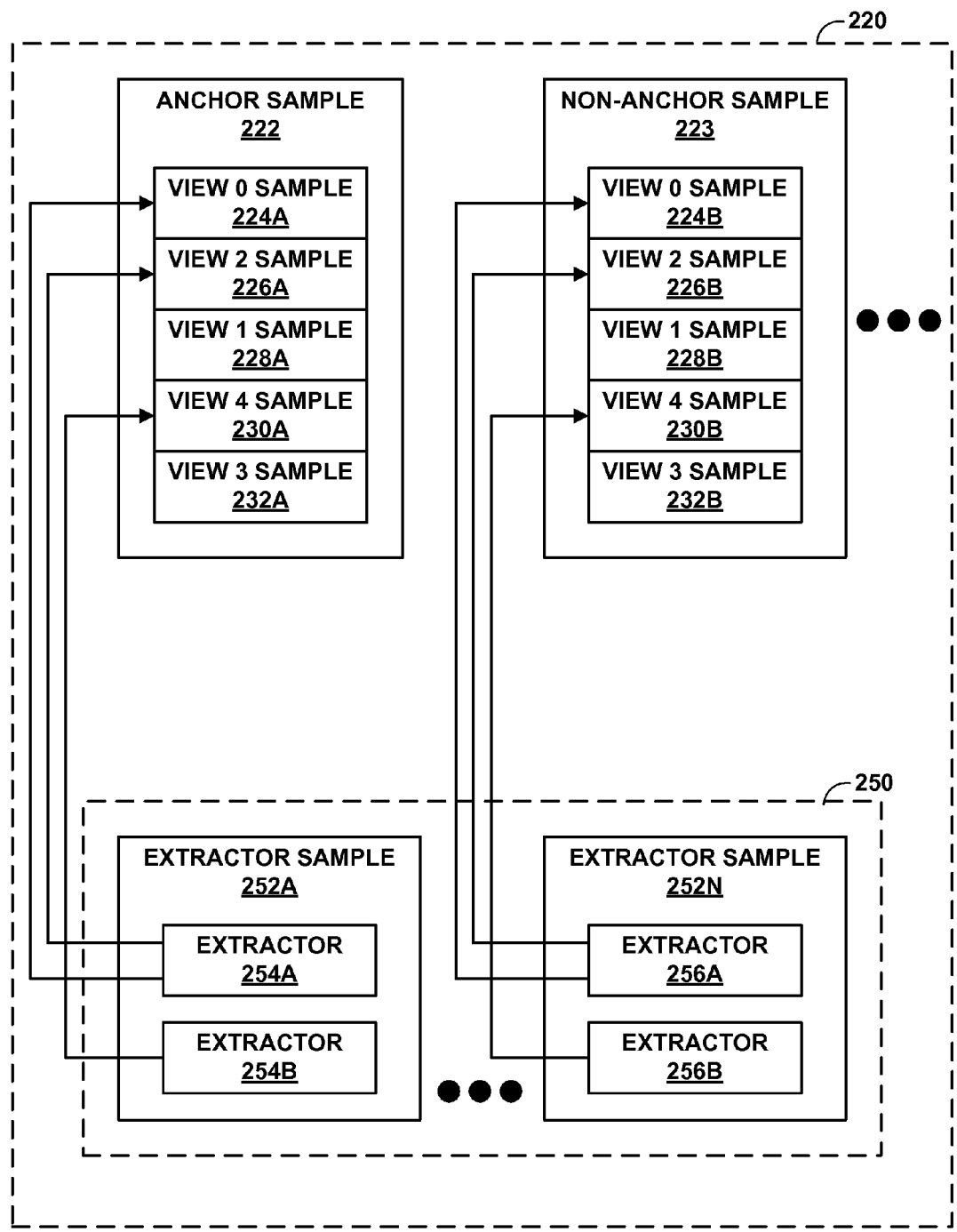

FIGS. 6A-6C are block diagrams illustrating examples of an MDAT box 220 of a file that includes examples of media extractors for various media extractor tracks. Each of FIGS. 6A-6C depicts anchor sample 222 that includes view 0 sample 224A, view 2 sample 226A, view 1 sample 228A, view 4 sample 230A, and view 3 sample 232A, and non-anchor sample 223 that includes view 0 sample 224B, view 2 sample 226B, view 1 sample 228B, view 4 sample 230B, and view 3 sample 232B. The ellipses beside non-anchor sample 223 indicate that additional samples may be included in MDAT box 220. Each of the anchor and non-anchor samples may collectively form a first track of the file. In one example, media extractor tracks for each set of extractors of the file depicted in FIGS. 6A-6C may correspond to a separate operation point of a video file conforming to the MVC file format, in accordance with the techniques of this disclosure. In this manner, the techniques of this disclosure may be used to generate one or more media extractor tracks corresponding to an operation point of a video file conforming to the MVC file format.

FIGS. 6A-6C depict extractors 240, 244, 250 of various media extractor tracks, where extractors 240, 244, 250 would each be included in MDAT box 220, but are illustrated in separate figures for purposes of clarity. That is, when fully assembled, MDAT box 220 may include each set of extractors 240, 244, and 250.

FIGS. 6A-6C provide an example of a file that includes a track that contains media extractors as well as real video samples. Various samples may be separately contained in different tracks according to different temporal levels. For each temporal level, a particular track may contain all the video samples as well as extractors to the tracks with lower temporal levels. The video samples (NAL units) may be separated into different tracks, while the track that with higher frame rate can have extractors pointing to the other tracks. In this way, it is possible to have movie fragments containing samples of only one temporal level and a movie fragment may possibly contain extractors pointing to other fragments. In this case, movie fragments of different tracks, but for the same time period, could be interleaved in increasing order of temporal level.

FIG. 6A provides an example of extractors 240 including extractors 242A-242N corresponding to a media extractor track. In this example, extractor 242A refers to both view 0 sample 224A of anchor sample 222. Extractor 242N refers to view 0 sample 224B of non-anchor sample 223. In general, an extractor of extractor set 240 refers to a corresponding view 0 sample, in the example of FIG. 6A. Each of extractors 242A-242N correspond to a common media extractor track, which may belong to a switch group and/or an alternate group. The media extractor track may further correspond to an individual operation point, e.g., an operation point including view 0.

In some examples, for stereo video coded using MVC, there can be three operation points, including one operation point support outputting two views, and a second operation point that supports outputting just one view (e.g., just view 0 or view 1). The third operation point could be an operation point outputting view 1. Depending on the prediction relationship, the third operation point may include only the VCL NAL units and the associated non-VCL NAL units in view 1, all the NAL units of view 0 and view 1, or the NAL units in view 1 as well as the anchor NAL units (that is, NAL units of the anchor view components). In such a stereo case, examples of the disclosed techniques may provide that the other two operation points can be represented by two extractor tracks. These two extractor tracks may form a switch group and, together with the original video track, these three tracks may form an alternate group.

This disclosure provides techniques for modifying the MVC file format to include MVC media extractor tracks. In general, MVC video tracks, including MVC media extractor tracks, with the same number of views for output may be characterized as switch groups. All operation points represented by the tracks of a file may belong to one alternate group of an MVC video presentation. The views of each of anchor sample 222 and non-anchor sample 223 may form a complete subset track, e.g., an operation point including all of the available views.

An extractor may refer to a continuous part of a sample, e.g., as shown with respect to extractors 246A-246N in FIG. 6B. In the example of FIG. 6B, extractor 246A refers to view 0 sample 224A and to view 2 sample 226A. The data structure representing extractor 246A may specify a byte range for the identified views, a starting view and an ending view, a starting view and a number of subsequent views, or other representation of a continuous series of views identified by the extractor. The set of extractors 244 may correspond to another media extractor track, which may in turn correspond to a separate MVC operation point.

Two extractors may also refer to two parts (e.g., two non-continuous views) of a sample, e.g., as shown with respect to extractors 254A, 256A in FIG. 6C. For example, extractor sample 252A includes extractor 254A that refers to view 0 sample 224A and view 2 sample 226A, as well as extractor 254B that refers to view 4 sample 230A. Thus the sample represented by extractor sample 252A may correspond to an extractor sample that references non-consecutive view samples. Similarly, extractor sample 252N, in the example of FIG. 6C, includes extractor 256A that references view 0 sample 224B and view 2 sample 226B, as well as extractor 256B that references view 4 sample 230B.

Extractors may also be defined with respect to anchor or non-anchor samples, where extractors defined with respect to anchor samples may refer to different views than extractors defined with respect to non-anchor samples.

The above mentioned MVC media extractor tracks in ISO base media file format or MVC file format can be can be instances of metadata tracks that can be implemented with similar extracting functionality and can be used to represent alternate and/or switch tracks of a normal video track.

In examples using the MVC file format, a full bitstream may be contained in one track and all other possible operation points may be represented by the extractor tracks, each of which may signal, e.g., a number of views for output, view identifier values of the views for output, bandwidth required for transmission, and frame rate.

FIG. 7 is a conceptual diagram illustrating an example MVC prediction pattern. In the example of FIG. 7, eight views (having view IDs "S0" through "S7") are illustrated, and twelve temporal locations ("T0" through "T11") are illustrated for each view. That is, each row in FIG. 7 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views. An anchor location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Table 1 below provides an example definition for an MVC extension sequence parameter set.

TABLE 1

| seq_parameter_set_mvc_extension( ) { | C | Descriptor |
|---|---|---|
| num_views_minus1 | 0 | ue(v) |
| for( i = 0; i <= num_views_minus1; i++ ) | | |
|   view_id[ i ] | 0 | ue(v) |
| for( i = 1; i <= num_views_minus1; i++ ) { | | |
|   num_anchor_refs_l0[ i ] | 0 | ue(v) |
|   for( j = 0; j < num_anchor_refs_l0[ i ]; j++ ) | | |
|     anchor_ref_l0[ i ][ j ] | 0 | ue(v) |
|   num_anchor_refs_l1[ i ] | 0 | ue(v) |
|   for( j = 0; j < num_anchor_refs_l1[ i ]; j++ ) | | |
|     anchor_ref_l1[ i ][ j ] | 0 | ue(v) |
| } | | |
| for( i = 1; i <= num_views_minus1; i++ ) { | | |
|   num_non_anchor_refs_l0[ i ] | 0 | ue(v) |
|   for( j = 0; j < num_non_anchor_refs_l0[ i ]; j++ ) | | |
|     non_anchor_ref_l0[ i ][ j ] | 0 | ue(v) |
|   num_non_anchor_refs_l1[ i ] | 0 | ue(v) |
|   for( j = 0; j < num_non_anchor_refs_l1[ i ]; j++ ) | | |
|     non_anchor_ref_l1[ i ][ j ] | 0 | ue(v) |
| } | | |
| num_level_values_signalled_minus1 | 0 | ue(v) |
| for(i = 0; i<= num_level_values_signalled_minus1; i++) { | | |
|   level_idc[ i ] | 0 | u(8) |
|   num_applicable_ops_minus1[ i ] | 0 | ue(v) |
|   for( j = 0; j <= num_applicable_ops_minus1[ i ]; j++ ) { | | |
|     applicable_op_temporal_id[ i ][ j ] | 0 | u(3) |
|     applicable_op_num_target_views_minus1[ i ][ j ] | 0 | ue(v) |
|     for( k = 0; k <= applicable_op_num_target_views_minus1[ i ][ j ]; k++ ) | | |
|       applicable_op_target_view_id[ i ][ j ][ k ] | 0 | ue(v) |
|     applicable_op_num_views_minus1[ i ][ j ] | 0 | ue(v) |
|   } | | |
| } | | |
| } | | | view component and a non-anchor view component in a view can have different view dependencies. For example, anchor view components in view S2 depend on the view components in view S0. However, non-anchor view components in view S2 do not depend on view components in other views.

Frames in FIG. 7 are indicated for each row and each column in FIG. 7 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the point-from object for prediction reference. For example, the P-frame of view S2 at temporal location T0 is predicted from the I-frame of view S0 at temporal location T0.

As with single view video encoding, frames of a multiview video coding video sequence may be predictively encoded with respect to frames at different temporal locations. For example, the b-frame of view S0 at temporal location T1 has an arrow pointed to it from the I-frame of view S0 at temporal FIG. 7 provides various examples of inter-view prediction. Frames of view S1, in the example of FIG. 7, are illustrated as being predicted from frames at different temporal locations of view S1, as well as inter-view predicted from frames of frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 7, capital "B" and lowercase "b" are intended to indicate different hierarchical relationships between frames, rather than different encoding methodologies. In general, capital "B" frames are relatively higher in the prediction hierarchy than lowercase "b" frames. That is, in the example of FIG. 7, "b" frames are encoded with reference to "B" frames. Additional hierarchical levels may be added having additional bidirectionally-encoded frames that may refer to the "b" frames of FIG. 7. FIG. 7 also illustrates variations in the prediction hierarchy using different levels of shading, where a greater amount of shading (that is, relatively darker)

frames are higher in the prediction hierarchy than those frames having less shading (that is, relatively lighter). For example, all I-frames in FIG. 7 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that frames relatively higher in the prediction hierarchy should be decoded before decoding frames that are relatively lower in the hierarchy, such that those frames relatively higher in the hierarchy can be used as reference frames during decoding of the frames relatively lower in the hierarchy. A view order index is an index that indicates the decoding order of view components in an access unit. The view order indices is implied in the SPS MVC extension, as specified in Annex H of H.264/AVC (MVC amendment). In the SPS, for each index i, the corresponding view_id is signaled. The decoding of the view components shall follow the ascending order of the view order index. If all the views are presented, then the view order indexes are in a consecutive order from 0 to num_views$_{13}$ minus_1.

In this manner, frames used as reference frames may be decoded before decoding the frames that are encoded with reference to the reference frames. A view order index is an index that indicates the decoding order of view components in an access unit. For each view order index i, the corresponding view_id is signaled. The decoding of the view components follows the ascending order of the view order indexes. If all the views are presented, then the set of view order indexes comprises a consecutively ordered set from zero to one less than the full number of views.

For certain frames at equal levels of the hierarchy, decoding order may not matter relative to each other. For example, the I-frame of view S0 at temporal location T0 is used as a reference frame for the P-frame of view S2 at temporal location T0, which is in turn used as a reference frame for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 7. Also, with respect to the example of FIG. 7, S0>S1, S2>S1, S2>S3, S4>S3, S4>S5, and S6>S5. Any decoding order for the views that does not violate these requirements is possible. Accordingly, many different decoding orders are possible, with only certain limitations. Two example decoding orders are presented below, although it should be understood that many other decoding orders are possible. In one example, illustrated in Table 2 below, views are decoded as soon as possible.

TABLE 2

|  | View ID | | | | | | | |
| --- | --- | --- | --- | --- | --- | --- | --- | --- |
|  | S0 | S1 | S2 | S3 | S4 | S5 | S6 | S7 |
| View Order Index | 0 | 2 | 1 | 4 | 3 | 6 | 5 | 7 |

The example of Table 2 recognizes that view S1 may be decoded immediately after views S0 and S2 have been decoded view S3 may be decoded immediately after views S2 and S4 have been decoded, and view S5 may be decoded immediately after views S4 and S6 have been decoded.

Table 3 below provides another example decoding order in which the decoding order is such that any view that is used as a reference for another view is decoded before views that are not used as reference for any other view.

TABLE 3

|  | View ID | | | | | | | |
| --- | --- | --- | --- | --- | --- | --- | --- | --- |
|  | S0 | S1 | S2 | S3 | S4 | S5 | S6 | S7 |
| View Order Index | 0 | 5 | 1 | 6 | 2 | 7 | 3 | 4 |

The example of Table 3 recognizes that frames of views S1, S3, S5, and S7 do not act as reference frames for frames of any other views, and therefore, views S1, S3, S5, and S7 are decoded after frames of those views that are used as reference frames, that is, views S0, S2, S4, and S6, in the example of FIG. 7. Relative to each other, views S1, S3, S5, and S7 may be decoded in any order. Accordingly, in the example of Table 3, view S7 is decoded before each of views S1, S3, and S5.

To be clear, there may be a hierarchical relationship between frames of each view as well as the temporal locations of the frames of each view. With respect to the example of FIG. 7, frames at temporal location T0 are either intra-predicted or inter-view predicted from frames of other views at temporal location T0. Similarly, frames at temporal location T8 are either intra-predicted or inter-view predicted from frames of other views at temporal location T8. Accordingly, with respect to a temporal hierarchy, temporal locations T0 and T8 are at the top of the temporal hierarchy.

Frames at temporal location T4, in the example of FIG. 7, are lower in the temporal hierarchy than frames of temporal locations T0 and T8 because frames of temporal location T4 are B-encoded with reference to frames of temporal locations T0 and T8. Frames at temporal locations T2 and T6 are lower in the temporal hierarchy than frames at temporal location T4. Finally, frames at temporal locations T1, T3, T5, and T7 are lower in the temporal hierarchy than frames of temporal locations T2 and T6.

In MVC, a subset of a whole bitstream can be extracted to form a sub-bitstream which still conforms to MVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require smooth viewing experience and might prefer views with view_id values S0, S1, and S2, while another other client may require view scalability and prefer views with view_id values S0, S2, and S4. If originally the view_ids are ordered respect to the example of Table 9, the view order index values are {0, 1, 2} and {0, 1, 4} in these two examples, respectively. Note both of these sub-bitstreams can be decoded as independent MVC bitstreams and can be supported simultaneously.

There can be many MVC sub-bitstreams that are decodable by MVC decoders. In theory, any combination of views that satisfies the following two properties can be decoded by an MVC decoder compliant to a certain profile or level: (1) the view components in each access unit are ordered in an increasing order of view order index, and (2) for each view in the combination, its dependent views are also included in the combination.

With respect to the techniques of this disclosure, various MVC sub-bitstreams may be represented using media extractor tracks and/or pure video sample tracks. Each of these tracks may correspond to an MVC operation point.

Figure 13:
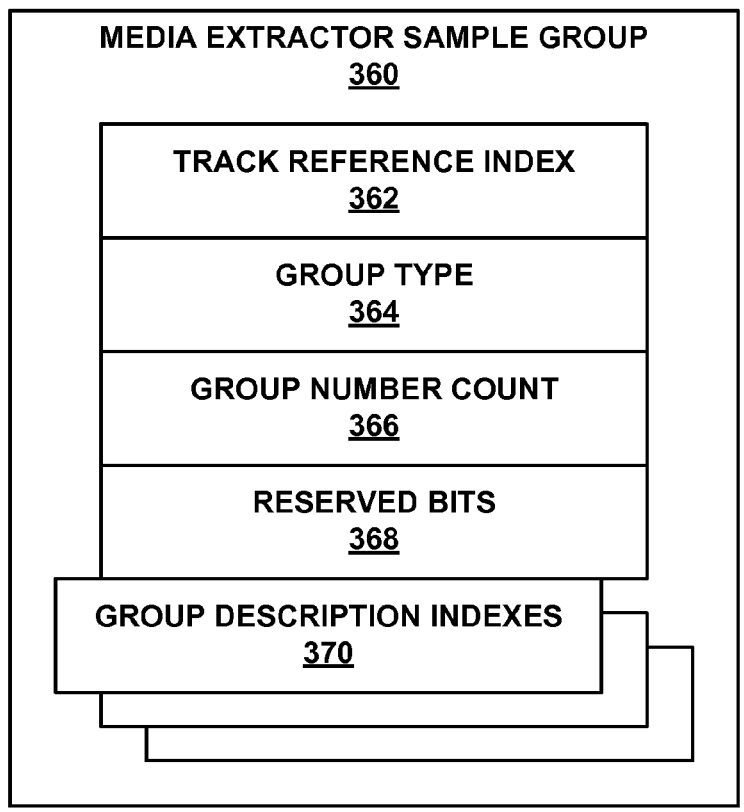
Figure 14:
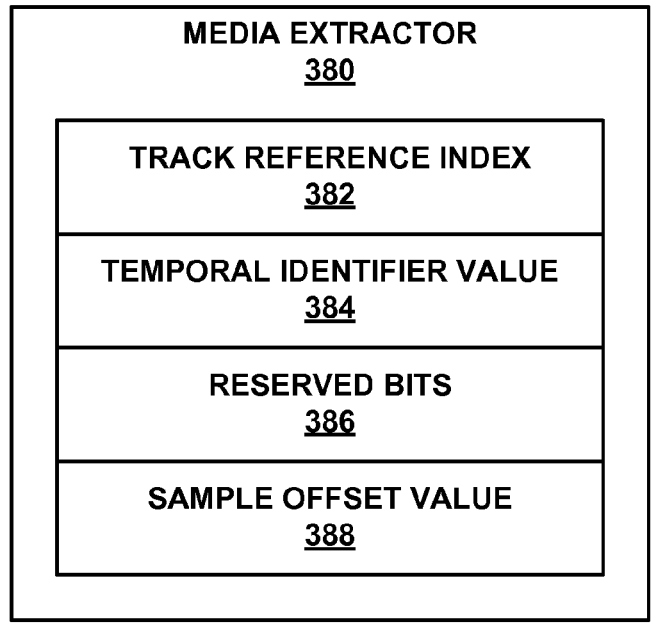

FIGS. 8-21 are block diagrams illustrating various examples of data structures for media extractors and other supporting data structures that may be used in accordance with the techniques of this disclosure. The various media extractors of FIGS. 8-22 include various features, as discussed in detail below. In general, any of the media extractors of FIGS. 8-21 may be included in a media extractor track of a file conforming to an ISO base media file format or an extension to the ISO base media file format to identify coded samples of the file. In general, a media extractor may be used to extract one or more whole samples from a referenced track. FIGS. 8-12 are examples of media extractors that are able to identify one video sample box of another track. As shown in FIG. 13, another way to implement the extractor is to enable sample grouping of samples from another track. To give more specific support for temporal scalability, a temporal identifier can be signaled, as shown in FIG. 14. FIGS. 16-22 are examples of media extractors for MVC and are able to extract one or more potentially non-consecutive NAL units from each video sample box (access unit). Various examples of extractors are based on offsets and lengths of bytes in a file or an access unit, while other examples can be purely based on the indices of whole NAL units, thus signaling of the byte ranges need not be necessary. The mechanism of signaling extractors with the indices of the whole NAL units can also be extended to SVC file format.

The examples of FIGS. 8-21 may also be applied to the 3GPP file format directly as extensions to the 3GPP file format. Elements and concepts of one or more of FIGS. 8-21 can also be combined with elements of other ones of FIGS. 8-22 to form other extractors. Although certain ones of FIGS. 8-21 are described with respect to a particular file format, in general, the examples of FIGS. 8-21 may be used with respect to any file format with similar characteristics, e.g., ISO base media file format or extensions of the ISO base media file format. To facilitate the usage of the proposed extractors in 3GPP, the 3GPP track selection box can be extended to include more characteristics for each of the (extracted) alternate track, such as temporal identifier, number of the views to be displayed and number of views to be decoded, as shown in the example of FIG. 21.

Figure 8:
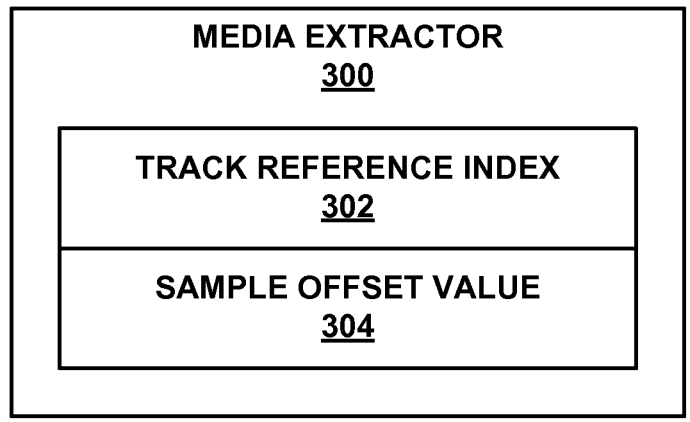
FIGS. 8-21 are block diagrams illustrating various examples of data structures for media extractors and other supporting data structures that may be used in accordance with the techniques of this disclosure.

FIG. 8 is a block diagram illustrating an example media extractor 300 that illustrates the format of a media extractor. In the example of FIG. 8, media extractor 300 includes track reference index 302 and sample offset value 304. Media extractor 300 may correspond to the definition of a data structure that may be instantiated within a media extractor track, in accordance with the techniques of this disclosure. Multiplexer 30 may be configured to include an extractor conforming to the example of media extractor 300 in a media extractor track of a video file to identify a NAL unit of a different track of the video file. Demultiplexer 38 may be configured to retrieve the identified NAL unit using the extractor conforming to media extractor 300.

Track reference index 302 may correspond to an identifier of a track in which an identified NAL unit is present. Each track of a video file may be assigned a unique index, in order to differentiate the tracks of the video file. Track reference index 302 may specify the index of the track reference to use to find the track from which to extract data. The sample in that track from which data is extracted may be exactly temporally aligned (in the media decoding timeline, using the time-to-sample table, adjusted by an offset specified by sample offset value 304) with the sample containing the extractor. In some examples, the first track of a video file has an index value of '1,' and therefore, multiplexer 30 may assign a value of '1' to track reference index value 302 to refer to the first track of a video file. A value of '0' for the track reference index value may be reserved for future use.

Sample offset value 304 defines an offset value from the temporal location of media extractor 300 in the media extractor track to an identified NAL unit of the track referenced by track reference index 302. That is, sample offset value 304 gives the relative index of the sample in the linked track that is used as the source of information. A value of zero for sample offset value 304 refers to the sample with the same, or most nearly preceding, decoding time to the sample containing the extractor. sample 1 (one) is the next sample, sample −1 (minus 1) is the previous sample, and so on. When a media extractor conforming to media extractor 300 is used in H.263 or MPEG-4 part 2, for example, the media extractor may be used to extract a temporal subset of the video track referenced by track reference index 302.

The pseudocode below provides an example definition of a media extractor class similar to media extractor 300.

```
class aligned(8) MediaExtractor ( ) {
    unsigned int(8) track_ref_index;
    signed int(8) sample_offset;
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

In the example pseudocode, the class MediaExtractor( ) is byte aligned. That is, when an extractor is instantiated from the MediaExtractor( ) class, the extractor will be aligned on an eight-byte boundary. The variable "track_ref_index" correspond to track reference index value 302, and in this example pseudocode, corresponds to an unsigned, eight byte integer value. The variable "sample_offset" corresponds to sample offset value 304 and, in this example, to a signed, eight byte integer value.

Figure 9:
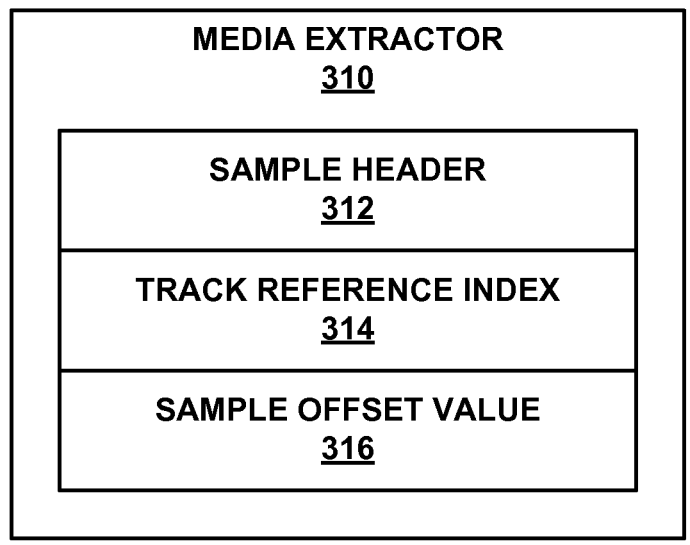

FIG. 9 is a block diagram illustrating another example of a media extractor 310. Media extractor 310 includes track reference index 314 and sample offset value 316, and in addition, includes sample header 312. Track reference index 314 and sample offset value 316 may generally include data similar to track reference index 302 and sample offset value 304 (FIG. 8).

Sample header 312, in an example corresponding to H.264/AVC, may be constructed according to NAL unit headers of a video sample referenced by media extractor 310. Sample header 312 may contain one byte of data with three syntax elements: forbidden_zero_bit, nal_ref_idc (which may comprise 3 bits), nal_unit_type (which may comprise 5 bits). The value of "nal_unit_type" may be 29 (or any other reserved number) and the other two syntax elements may be the same as those syntax elements in the identified video sample. For examples conforming to MPEG-4 part-2 visual, sample header 312 may comprise a four byte code, which may include the start code prefix of "0x 00 00 01" and start code of "0x C5" (or any other reserved number), where "0x" indicates that the value following the "0x" is a hexadecimal value. For H.263, sample header 312 may also include a byte aligned start code that is different from the start code of the normal video samples. Sample header 312 may be used by demultiplexer 38 for the purpose of synchronization, such that an extractor may be regarded as a normal video sample.

The pseudocode below provides an example definition of a media extractor class similar to media extractor 310:

```
class aligned(8) MediaExtractor ( ) {
    SampleHeader ( );
    unsigned int(8) track_ref_index;
    signed int(8) sample_offset;
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

Figure 10:
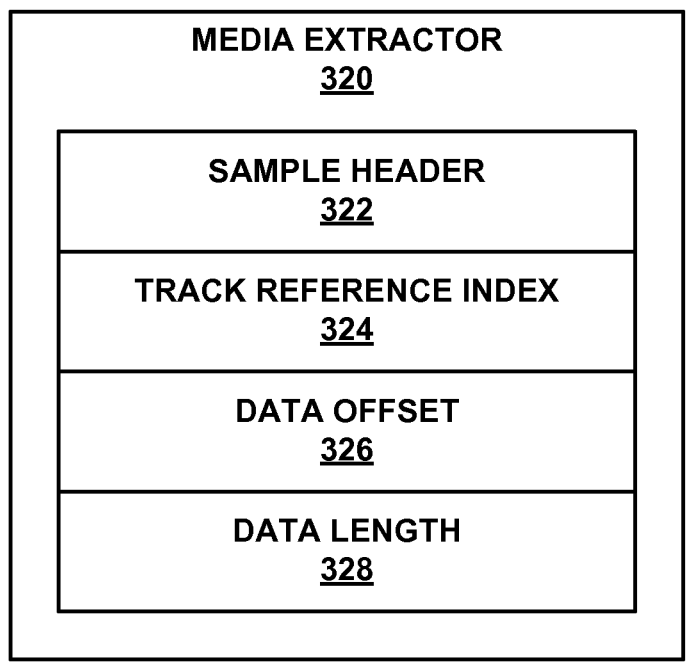

FIG. 10 is a block diagram illustrating an example media extractor 320 that identifies NAL units by signaling the byte range of the identified NAL units within the extractor. Media extractor 320 includes sample header 322, which may be similar to sample header 312, and track reference index 324, which may be similar to track reference index 302. Rather than a sample offset value, however, the example of media extractor 320 includes data offset value 326 and data length value 328.

Data offset value 326 may describe the starting point of data identified by media extractor 320. That is, data offset value 326 may comprise a value representative of the offset to the first byte within the track identified by track index value 324 to copy. Data length value 328 may describe the number of bytes to copy, and accordingly, may be equivalent to the length of the referenced sample (or samples, when referencing multiple NAL units).

The following pseudocode provides an example definition of a media extractor class similar to media extractor 320:

```
class aligned(8) MediaExtractor ( ) {
    SampleHeader ( );
    unsigned int(8) track_ref_index;
    unsigned int(32) data_offset;
    signed int(32) data_length;
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

Figure 11:
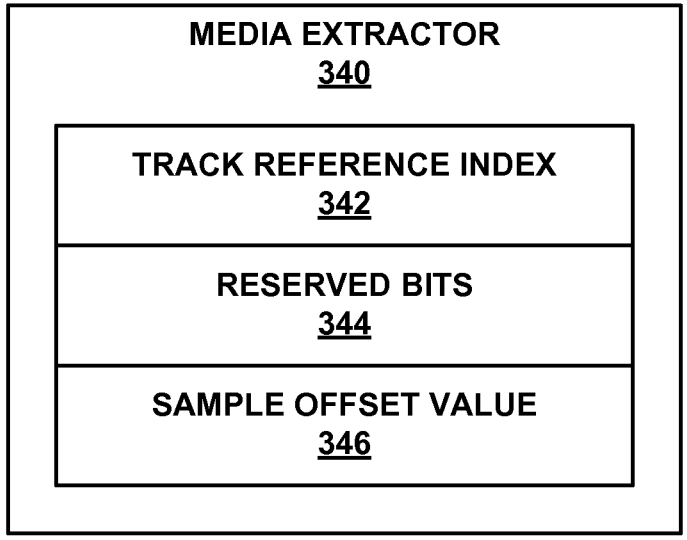

FIG. 11 is a block diagram illustrating an example media extractor 340 that contains reserved bits for future extensibility. Media extractor 340 includes track reference index 342 and sample offset value 346, which may be similar to media extractor 302 and sample offset value 304, respectively. In addition, media extractor 340 includes reserved bits 344, which may comprise reserved bits used for future extensions to the media extractor. The following pseudocode provides an example class definition of a media extractor class similar to media extractor 340:

```
class aligned(8) MediaExtractor ( ) {
    unsigned int(8) track_ref_index;
    unsigned int(8) reserved_bits;
    signed int(8) sample_offset;
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

Figure 12:
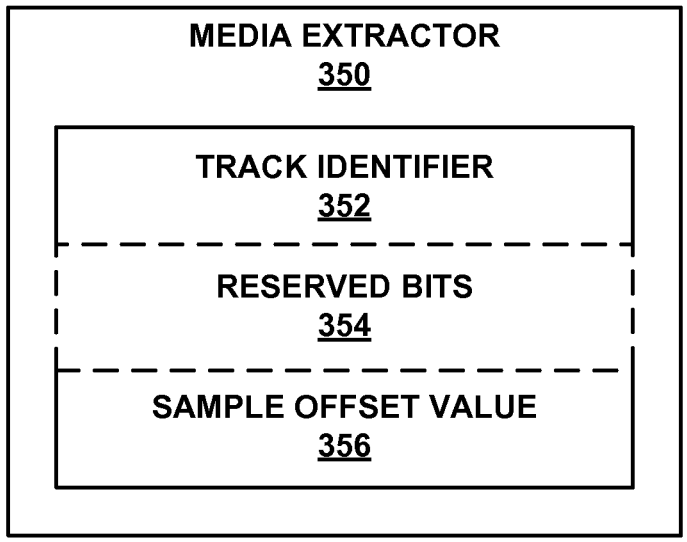

FIG. 12 is a block diagram illustrating an example media extractor 350 that uses a track identifier value, rather than a track reference index value. Use of a track identifier value to identify a track may refer to the presentation of track reference box in the ISO base media file format. The example of media extractor 350 includes track identifier 352, reserved bits 354, and sample offset value 356. Reserved bits 354 are optional, as indicated by the dashed line around reserved bits 354. That is, some examples may include reserved bits 354, while other examples may omit reserved bits 354. Sample offset value 356 may be similar to sample offset value 304.

Track identifier 352 specifies the track ID of the track from which to extract data. The sample in the track from which data that is extracted may be temporally aligned (in the media decoding timeline, using the time-to-sample table, adjusted by an offset specified by sample offset 356) with the sample containing media extractor 350. The first track reference may be assigned an identifier value of 1. The value of 0 may be reserved for future use and extensions.

The following pseudocode provides an example definition of a media extractor class similar to media extractor 350:

```
class aligned(8) MediaExtractor ( ) {
    unsigned int(8) track_id;
    unsigned int(8) reserved_bits;
    signed int(8) sample_offset;
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

FIG. 13 is a block diagram illustrating an example media extractor sample group 360. Multiplexer 30 may include media extractor sample group 360 in a message-type box (having type identifier "MESG"), in a sample table box container. Multiplexer 30 may be configured to include zero or one media extractor sample group 360 objects in the message box. In the example of FIG. 13, media extractor sample group 360 includes track reference index 362, group type 364, group number count 366, reserved bits 368, and group description indexes 370.

Track reference index 362 specifies the index of the track reference used to find the track from which to extract data from the sample groups under certain criteria. That is, track reference index 362 identifies the track from which to extract data identified by the media extractor, in a manner similar to track reference index 302.

Group type value 364 identifies the type of sample group to which media extractor sample group 360 corresponds. Group type value 364 generally identifies the criteria used to form the sample groups of the sampling group and links the criteria to a sample group description table with the same value for group type in the track identified by track reference index 362. Group type value 364 may comprise an integer value. In this manner, the group type value of media extractor sample group 360 may be the same as the group type of the track to which track reference index 362 refers. Alternatively, for a video temporal subset, group type value 364 may be defined as "vtst," the media extractor sample group can be defined only for that group type and the syntax table would not need the syntax element of "grouping type."

Group number count value 366 may describe a number of sample groups in the media extractor track including media extractor sample group 360. A value of zero for group number count value 366 may represent that all sample groups under the criteria referenced by group type value 364 are used to form the media extractor track. Group description index 368 defines an index of the sample group entry that is used to form the media extractor track in the sample group description table.

In accordance with the techniques of this disclosure, an assembling process may be used to place all the samples in the sample group entries such that the samples are temporally ordered, such that a sample A following sample B in the media extractor track indicates that sample A follows sample B in the track referred to by track reference index 362.

The pseudocode below provides an example definition of a media extractor sample group class similar to media extractor sample group 360:

```
class aligned(8) MedEtrSampleGroup ( ) {
    unsigned int(8) track_ref_index;
    unsigned int(32) grouping_type;
    unsigned int(32) group_number_count;
    for ( i =0; i< group_number_count; i++ )
        unsigned int (32) group_description_index;
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

FIG. 14 is a block diagram illustrating an example media extractor 380 that may be used in the context of video files conforming to AVC file format. The example of media extractor 380 includes track reference index 382, temporal identifier value 384, reserved bits 386, and sample offset value 388. Track reference index 382 and sample offset value 388 may be used in a manner similar to track reference index 302 and sample offset value 304, respectively. Reserved bits 386 may be reserved for future uses, and are not assigned a semantic value at this time.

Temporal identifier value 384 specifies the temporal level of a sample to be extracted by media extractor 380. In one example, the temporal level is in the range of 0 to 7, inclusive. As discussed above, encoded pictures may correspond to temporal level, where the temporal level generally describes the encoding hierarchy between the frames. For example, key frames (also referred to as anchor frames) may be assigned the highest temporal level, while frames that are not used as reference frames may be assigned relatively lower temporal levels. In this manner, media extractor 380 may identify extracted samples from the track referenced by track reference index 382 by referring to the temporal level of the samples, rather than explicitly identifying the samples themselves. A media extractor track with media extractors up to a higher value than that defined by temporal identifier value 384 may correspond to an operation point with a higher frame rate.

The pseudocode below provides an example definition of a media extractor class similar to media extractor 380:

```
class aligned(8) MediaExtractor ( ) {
    unsigned int(8) track_ref_index;
    unsigned int(3) temporal_id;
    unsigned int(5) reserved_bits;
    signed int(8) sample_offset;
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

Figure 15:
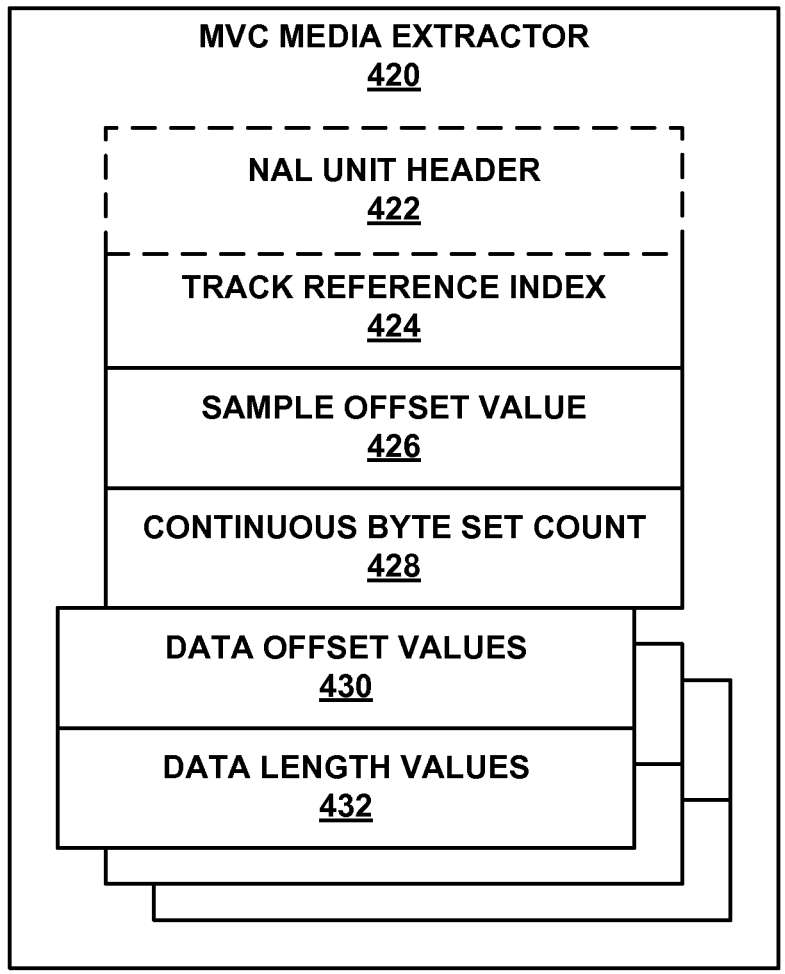

FIG. 15 is a block diagram illustrating an example MVC media extractor 420 that may be used to modify MVC to include media extractor tracks. The example of media extractor 420 includes an optional NAL unit header 422, track reference index 424, sample offset 426, continuous byte set count 428, and a loop of values including data offset values 430 and data length values 432. MVC media extractor 420 may be used to extract a number of NAL units of a subset of view components from a particular track. The example of MVC media extractor 420 can skip view components in a track when extracting data from a sample of a referenced track.

When present, NAL unit header 422 may mirror the NAL unit header of the NAL units identified by MVC media extractor 420. That is, NAL unit header 422 syntax elements may be generated according to the NAL unit header syntax in the extractor or aggregator generation process defined in the MVC file format. In some examples, the extractor may not need NAL unit header 422, e.g., when a series of extractors would be generated to include related NAL unit headers.

Track reference index value 424 specifies the index of the track reference to use to find the track from which to extract data. The sample in the track from which data is extracted may be temporally aligned in the media decoding timeline, adjusted by an offset specified by sample offset value 426, with the sample containing MVC media extractor 420. The first track reference may be designated to receive an index value of one, and a value of zero for the track reference index value may be reserved.

Sample offset value 426 defines an offset, relative to the temporal location of MVC media extractor 420, of the sample to be extracted that is located in the track referred to by track reference index value 424. A value of zero for sample offset value 426 indicates that the sample to be extracted is in the same temporal location, negative one indicates a previous sample, positive one indicates a next sample, and so on.

Continuous byte set count 428 describes a number of continuous byte sets of the sample of the track from which to extract data. If continuous byte set count 428 has a value of zero, the entire referenced sample in the track is to be extracted. The continuous byte sets may also be referred to as separate portions of a sample.

Data offset values 430 and data length values 432 occur in a loop. In general, the number of iterations of the loop, that is, the number of data offset values 430 and data length values 432, is related to the number of portions of a sample to be extracted (e.g., a number of continuous byte sets). Thus two or more portions of a sample can be extracted using MVC media extractor 420. For each portion of a sample to be extracted, a corresponding one of data offset values 430 indicates the beginning of the portion (e.g., a first byte of the portion, relative to the first byte of the sample), and a corresponding one of data length values 432 indicates the length, e.g., the number of bytes, to copy. In some examples, a value of zero for one of data length values 432 may indicate that all remaining bytes in the sample are to be copied, i.e., that the portion corresponds to the byte indicated by the corresponding one of data offset values 430 and all other contiguous bytes up to the end of the sample.

The pseudocode below provides an example definition of a media extractor class similar to MVC media extractor 420:

```
class aligned(8) MediaExtractorMVC ( ) {
    NALUnitHeader( ); // may be omitted in some examples
    unsigned int(8) track_ref_index;
    signed int(8) sample_offset;
    unsigned int(8) continuous_byte_set_count;
    for ( i = 0 ; i < continuous_byte_set_count; i++ ) {
        unsigned int((lengthSizeMinusOne+1)*8)
            data_offset;
        unsigned int((lengthSizeMinusOne+1)*8)
            data_length;
    }
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

Figure 16:
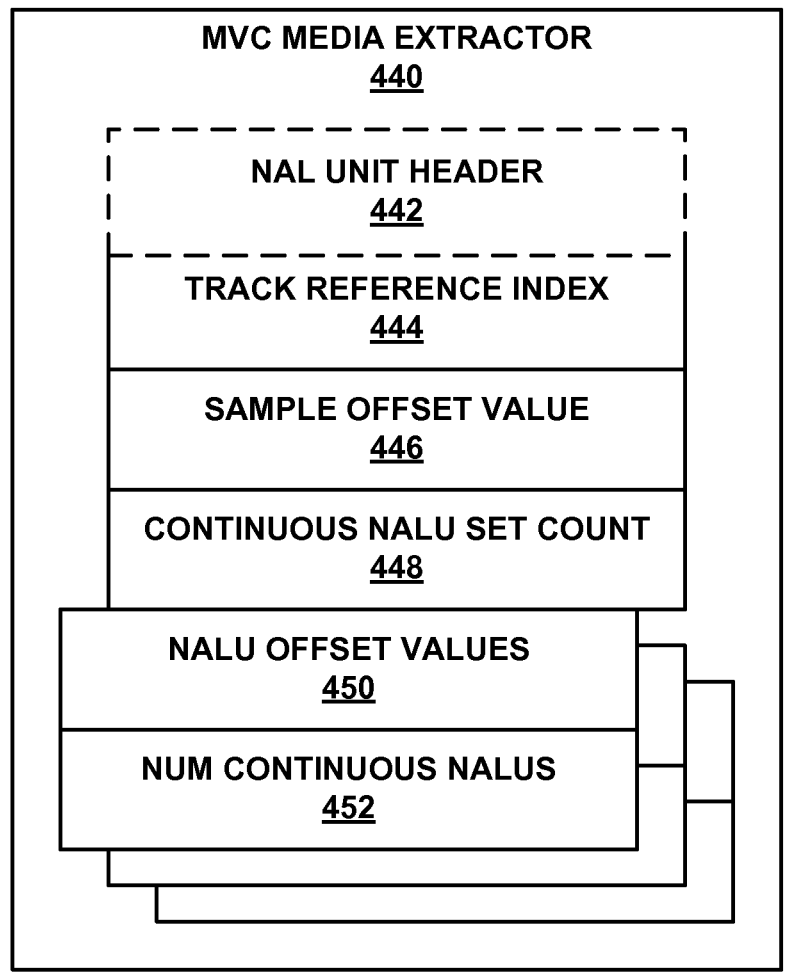

FIG. 16 is a block diagram illustrating another example MVC media extractor 440 that may be used to modify MVC to include media extractor tracks. The example of MVC media extractor 440 identifies particular NAL units for extraction, as opposed to specific bytes of a sample as described with respect to the example of FIG. 15. In the example of FIG. 16, MVC media extractor 440 includes an optional NAL unit header 442, track reference index 444, sample offset 446, continuous NALU (NAL unit) set count 448, and a loop of NALU offset values 450 and numbers of continuous NAL units 452. NAL unit header 442, track reference index 444, and sample offset value 446 are generally defined the same way as NAL unit header 422, track reference index 424, and sample offset value 426, respectively.

Continuous NALU set count 448 describes a number of continuous NAL units of the sample of the track from which to extract data. In some examples, if this value is set to zero, the entire referenced sample in the track is extracted.

NALU offset values 450 and numbers of continuous NALUs 452 occur in a loop. In general, there are as many instances of NALU offset values and numbers of continuous NALUs as there are sets of continuous NALUs, as defined by continuous NALU set count 448. Each NALU offset value describes the offset of a corresponding NAL unit at the sample of the track from which to extract data. The NAL units starting from this offset of NAL units may be extracted using this extractor. Each number of continuous NALU value describes the number of entire, single referenced NAL units to copy for a corresponding set of NAL units.

The pseudocode below provides an example definition of a media extractor class similar to MVC media extractor 440:

```
class aligned(8) MediaExtractorMVC ( ) {
    NALUnitHeader( ); // may be omitted in some examples
    unsigned int(8) track_ref_index;
    signed int(8) sample_offset;
    unsigned int(8) continuous_NALU_set_count;
    for ( i = 0 ; i < continuous_NALU_Set_Count; i++ ) {
        unsigned int((lengthSizeMinusOne+1)*8)
            NALU_offset;
        unsigned int((lengthSizeMinusOne+1)*8)
            num_continuous_NALUs
    }
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

Figure 17:
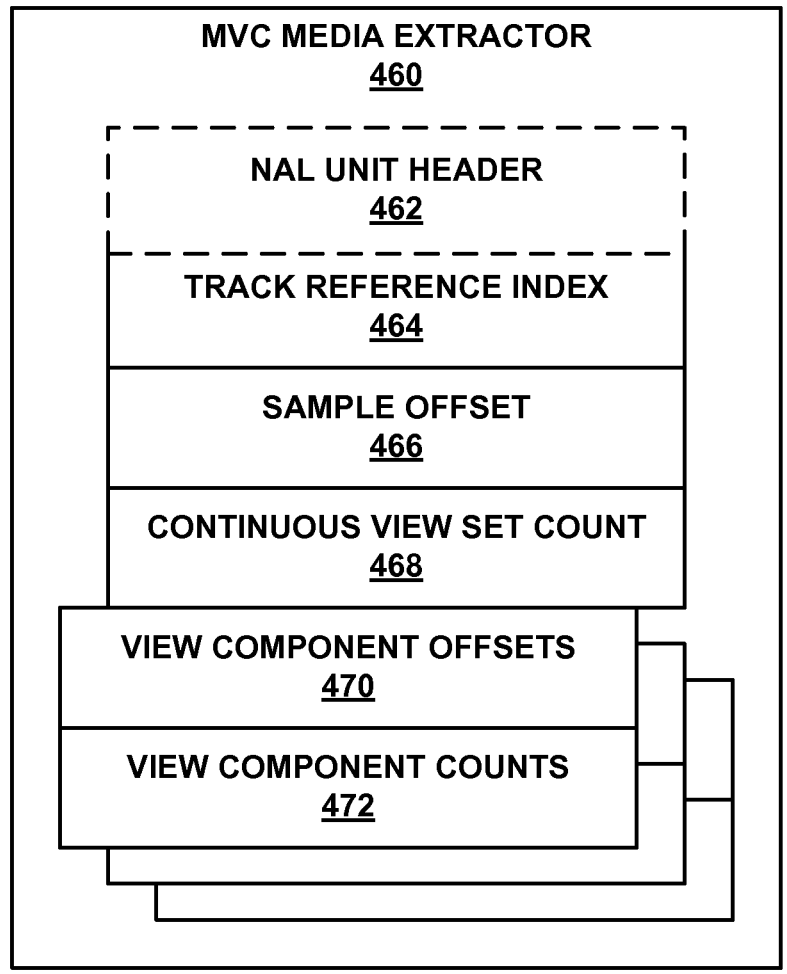

FIG. 17 is a block diagram illustrating another example MVC media extractor 460 that aggregates NAL units in the same view component when there are more than one NAL units for a view component. MVC media extractor 460 may then be used to extract the identified view components. In the example of FIG. 17, MVC media extractor 460 includes an optional NAL unit header 462, track reference index 464, sample offset 466, continuous view set count 468, and a loop of view component offset values 470 and view component counts 472. NAL unit header 462, track reference index 464, and sample offset value 466 are generally defined the same way as NAL unit header 422, track reference index 424, and sample offset value 426, respectively.

Continuous view set count 468 defines a number of continuous view components of an identified sample in the track identified by track reference index 464 from which to extract data. Multiplexer 30 may set the value of continuous view set count 468 is to zero to indicate that the entire referenced sample in the track is to be extracted.

View component offset values 470 and view component counts 472 occur in a loop. In general, there are as many iterations of the loop as the value of continuous view set count 468, and each loop corresponds to one of the continuous view sets. Each of view component offset values 470 indicates the offset of the first view component at the sample of the track from which to extract data for a corresponding continuous view set. The view components starting from this offset of view components may then be extracted using MVC media extractor 460. Each of view component counts 472 describes the number of entire referenced view components in the sample to copy for the corresponding continuous view set.

The pseudocode below provides an example definition of a media extractor class similar to MVC media extractor 460:

```
class aligned(8) MediaExtractorMVC ( ) {
    NALUnitHeader( ); // may be omitted in some examples
    unsigned int(8) track_ref_index;
    signed int(8) sample_offset;
    unsigned int(8) continuous_view_set_count;
    for ( i = 0 ; i < continuous_view_set_count; i++) {
        unsigned int((lengthSizeMinusOne+1)*8)
            view_component_offset;
        unsigned int((lengthSizeMinusOne+1)*8)
            view_component_count
    }
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

Figure 18:
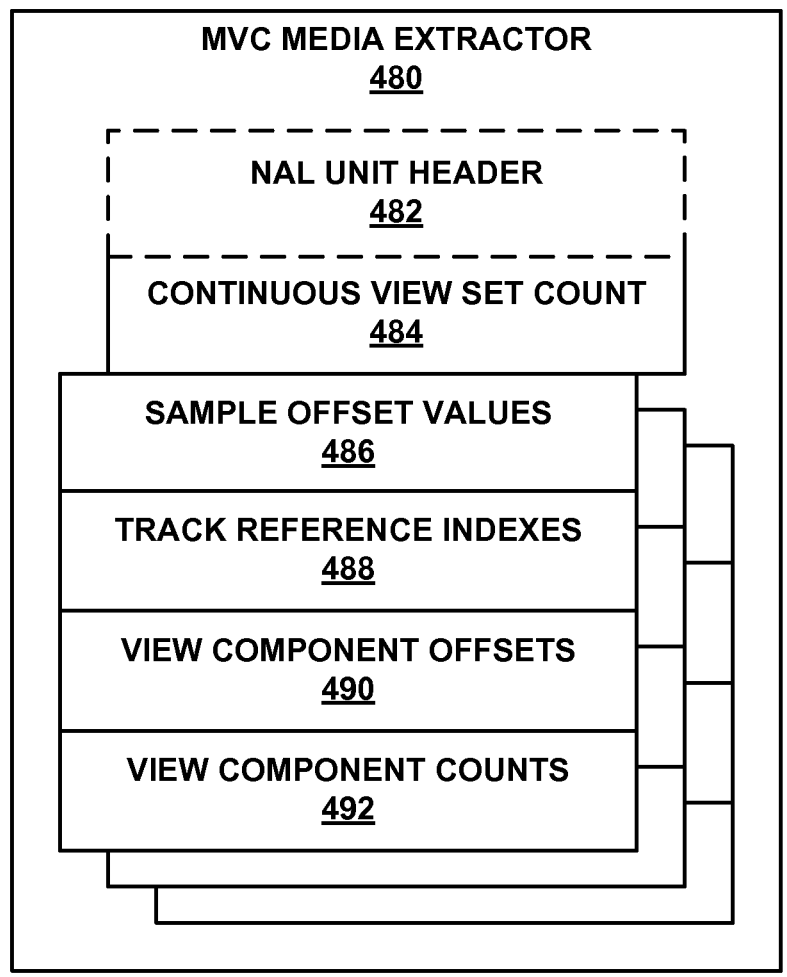

FIG. 18 is a block diagram illustrating another example of an MVC media extractor 480 that may be used to refer to various tracks. In the example of FIG. 18, MVC media extractor 480 includes an optional NAL unit header 482, continuous view set count 484, and a loop of sample offset values 486, track reference index values 488, view component offset values 490, and view component counts 492. NAL unit header 482 may be defined similarly to NAL unit header 422, and may be omitted in some examples.

Continuous view set count 484 gives the number of continuous view component of the sample of the media extractor track, with track reference index of track_ref_index, from which to extract data. The track_ref_index value may specify the index of the track reference to use to find the track from which to extract data. The view components in the track from which data is extracted may be temporally aligned (in the media decoding timeline, using the time-to-sample table, adjusted by an offset specified by the corresponding one of sample offset values 486) with the sample containing the MediaExtractorMVC. The first track reference may have the index value 1; the value 0 may be reserved for future use.

The example of MVC media extractor 480 includes each of sample offset values 486, track reference index values 488, view component offset values 490, and view component counts 492 in a loop. Each iteration of the loop corresponds to a particular track from which to extract data for a sample corresponding to MVC media extractor 480.

Sample offset values 486 define the relative index of the sample in the track referenced by a corresponding one of track reference index values 488, which may be used as the source of information. Sample 0 (zero) is the sample in the track identified by the corresponding one of track reference index values 488 with the same, or most nearly preceding, decoding time to the sample containing MVC media extractor 480, sample 1 (one) is the next sample, sample −1 (minus 1) is the previous sample, and so on.

Each of track reference index values 488 specifies the index of the track reference to use to find the track from which to extract data for the corresponding iteration of the loop. By using multiple track reference index values, MVC media extractor 480 may extract data from multiple different tracks.

Each of view component offset values 490 describes the offset of the first view component at the sample of the track, with a track reference index corresponding to the corresponding one of track reference index values 488 in this iteration of the loop, from which to extract data. The view components starting from this offset of view components may be extracted using MVC media extractor 480. In some examples, a media extractor similar to those of FIGS. 15-17 may be constructed that has a nested loop structure, in which an outer loop iterates over the tracks from which samples are to be extracted and an inner loop iterates over the samples to be extracted from the corresponding tracks. Each of view component counts 492 describes a number of referenced view components in the sample of the track with a track reference index corresponding to the current one of track reference index values 488 in this iteration of the loop.

The pseudocode below provides an example definition of a media extractor class similar to MVC media extractor 480:

```
class aligned(8) MediaExtractorMVC ( ) {
    NALUnitHeader( ); // may be omitted in some examples
    unsigned int(8) continuous_view_set_count;
    for ( i = 0 ; i < continuous_view_set_count; i++) {
        signed int(8) sample_offset;
        unsigned int(8) track_ref_index;
        unsigned int((lengthSizeMinusOne+1)*8)
            view_component_offset;
        unsigned int((lengthSizeMinusOne+1)*8)
            view_component_count
    }
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

Figure 19:
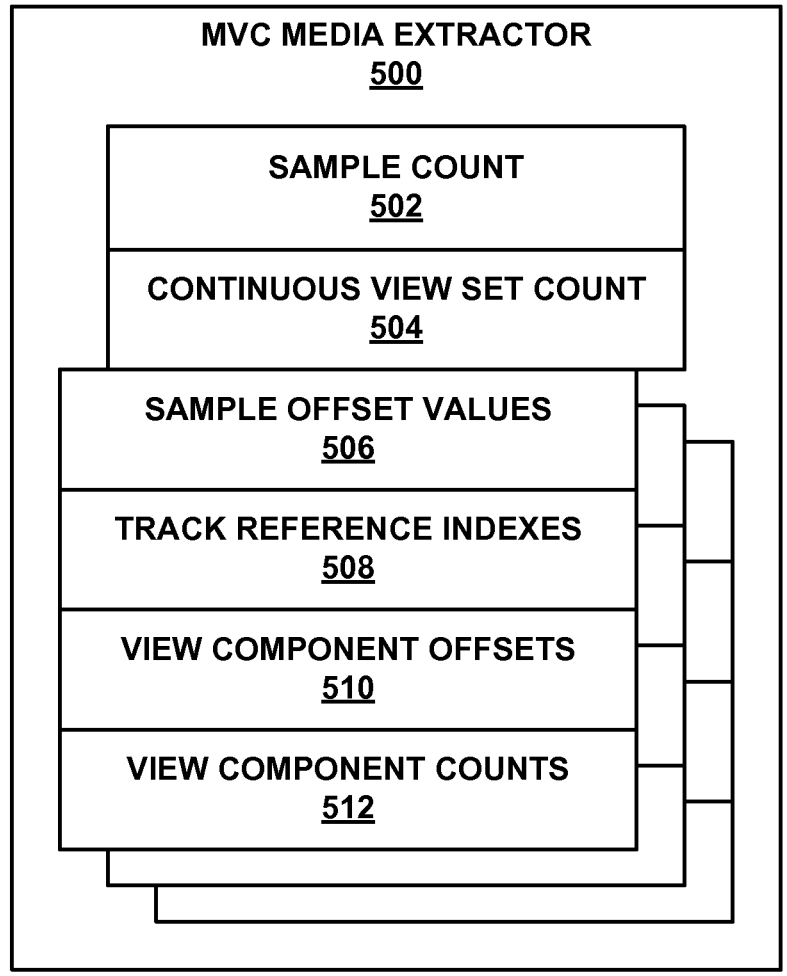

FIG. 19 is a block diagram illustrating another example MVC media extractor 500 that signals the duration of the extractor. MVC media extractor 500 may provide one or more advantages when different samples in the media extractor track share the same syntax elements of the extractors. In the example of FIG. 19, MVC media extractor 500 includes sample count 502, continuous view set count 504, sample offset values 506, track reference indexes 508, view component offsets 510, and view component counts 512.

Continuous view set count 504, sample offset values 506, track reference indexes 508, view component offsets 510, and view component counts 512 may generally be defined according to corresponding ones of continuous view set count 484, sample offset values 486, track reference indexes 488, view component offsets 490, and view component counts 492. Sample count 502 may define the number of continuous samples in the media extractor track containing MVC media extractor 500 that use the same media extractor.

The pseudocode below provides an example definition of a media extractor class similar to MVC media extractor 500:

```
class aligned(8) MediaExtractorMVC ( ) {
    unsigned int(8) sample_count;
    unsigned int(8) continuous_view_set_count;
    for ( i = 0 ; i < continuous_view_set_count; i++) {
        signed int(8) sample_offset;
        unsigned int(8) track_ref_index;
        unsigned int((lengthSizeMinusOne+1)*8)
            view_component_offset;
        unsigned int((lengthSizeMinusOne+1)*8)
            view_component_count
    }
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

Figure 20:
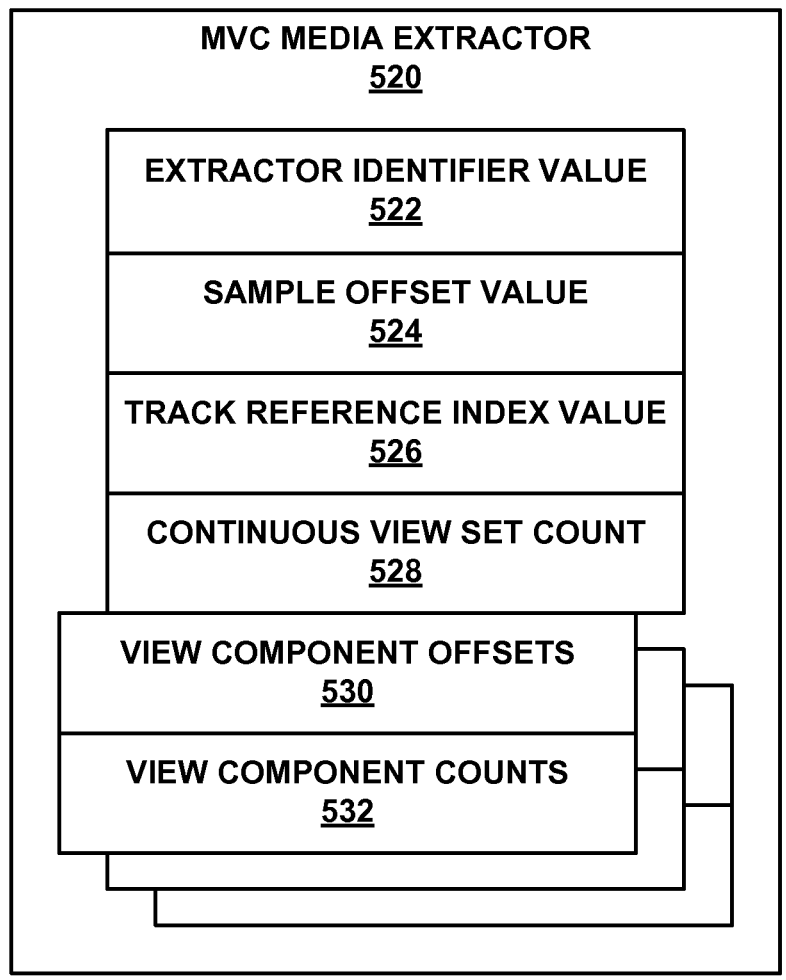
Figure 21:
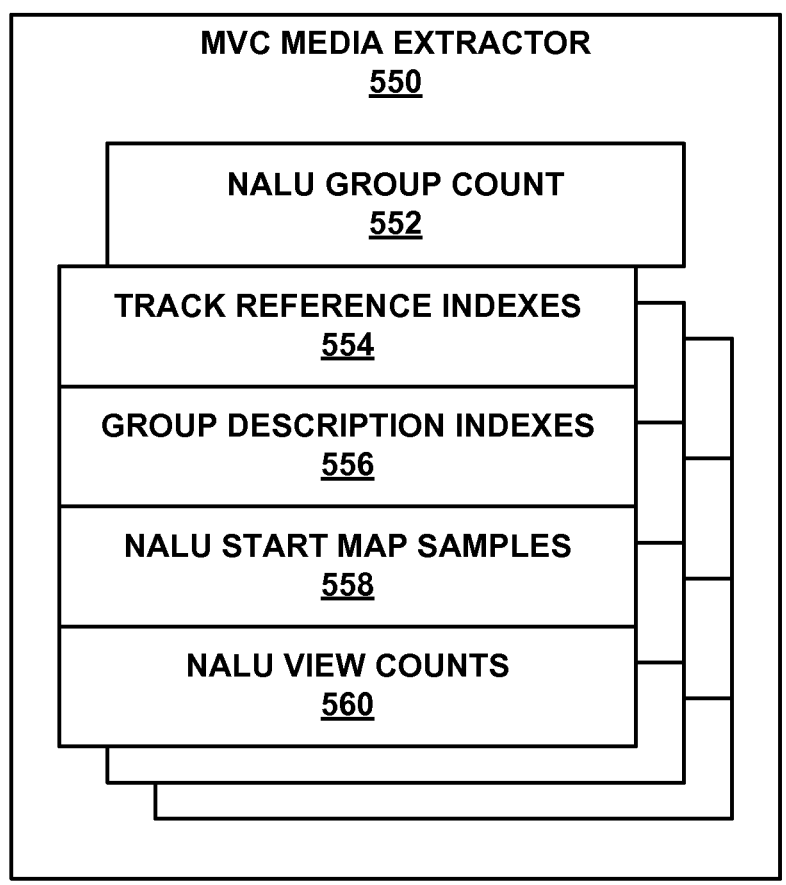

FIG. 20 is a block diagram illustrating another example MVC media extractor 520 that defines a set of different extractors. For each sample in a media extractor track, the sample can either use one or more of the set of extractors or a reference to the extractors. That is, a set of media extractors similar to MVC media extractor 520 may be defined and each sample may either use one or more of the set of extractors or a reference to the extractors to identify a sample of another track.

The example of MVC media extractor 520 includes extractor identifier value 522, sample offset value 524, track reference index value 526, continuous view set count 528, and a loop including view component offsets 530 and view component counts 532. Sample offset value 524, continuous view set count 528, view component offsets 530, and view component counts 532 may be defined according to corresponding ones of continuous view set count 484, sample offset values 486, view component offsets 490, and view component counts 492. Track reference index value 526 may be defined according to, e.g., track reference index 464.

Extractor identifier value 522 defines an identifier of the extractor, that is, MVC media extractor 520. Extractors in the same media extractor track are assigned different extractor identifier values, such that a sample in the media extractor track may refer to the extractor identifier value to use the media extractor. A reference extractor box may also be defined to include a number of extractors and a reference extractor identifier. The number of extractors value may provide the number of extractors used to copy the data for the sample in the extractor track. When the number of extractors value is equal to zero, the extractor having a predetermined extractor identifier, e.g., an extractor identifier equal to zero, may be used. The reference extractor identifier may provide the extractor identifier of the extractor used to copy the data for the sample in the extractor track. This box may be included in a sample of the media extractor track.

The pseudocode below provides an example definition of a media extractor class similar to MVC media extractor 520:

```
class aligned(8) MediaExtractorMVC ( ) {
    unsigned int((lengthSizeMinusOne+1)*8) extractor_id;
    signed int(8) sample_offset;
    unsigned int(8) track_ref_index;
    for ( i = 0 ; i < continuous_view_set_count; i++) {
        unsigned int((lengthSizeMinusOne+1)*8)
            view_component_offset;
        unsigned int((lengthSizeMinusOne+1)*8)
            view_component_count;
    }
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

The pseudocode below provides an example definition of a reference extractor box class for the reference extractor box described above:

```
class aligned(8) RefExtractorMVC ( ) {
    unsigned int((lengthSizeMinusOne+1)*8)
        num_extractor ;
    for ( i = 0 ; i < num_extractor; i++ )
        ref_extractor_id ;
    }
}
```

Figure 22:
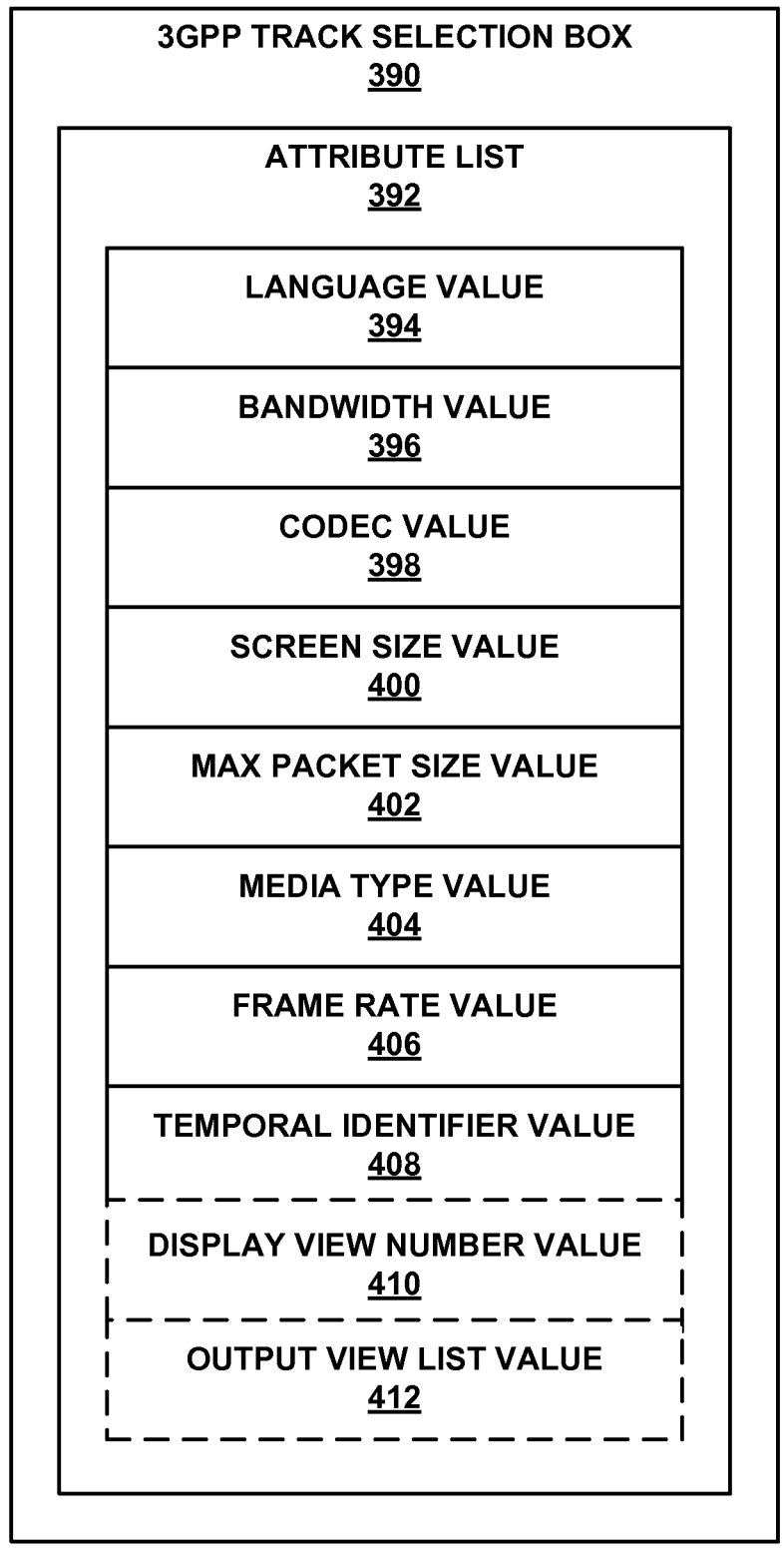
FIG. 22 is a block diagram illustrating an example modified Third Generation Partnership Project (3GPP) track selection box to signal additional attributes for a track selection box.

FIG. 21 is a block diagram illustrating an example MVC media extractor 550 that may be formed using a map sample group. The example of MVC media extractor 550 specifies NAL units groups from a series of sample entries, each of which contributes continuous NAL units in the map sample group. In the example of FIG. 22, MVC media extractor 550 includes NALU group count 552 and a loop including track indexes 554, group description indexes 556, NALU start map samples 558, and NALU view counts 560.

NALU group count 552 specifies the number of NAL unit groups from a map sample group entry in a reference track. Track reference indexes 554 each specify the index of the track reference to use to find the track from which to extract data for the corresponding iteration of the loop. Group description indexes 556 each specify the index of the map sample group entry that is used to form the NAL unit group for the corresponding iteration of the loop. NALU start map samples 558 each specify the offset of the NAL unit in the map sample group with a map sample entry index of the corresponding one of group description indexes 556 in the corresponding iteration of the loop. NALU view counts 560 specify the number of continuous NAL units, to be extracted into the media extractor, in the map sample group with a map sample entry index of the corresponding one of group description indexes 556 in the corresponding iteration of the loop.

The pseudocode below provides an example definition of a media extractor class similar to MVC media extractor 550:

```
class aligned(8) MedEtrMapSampleGroup ( ) {
    unsigned int(32) NALU_group_count;
    for ( i =0; i< NALU_group_count; i++ ) {
        unsigned int(8) track_ref_index;
        unsigned int(32) group_description_index;
        unsigned int(8) NALU_start_map_sample;
        unsigned int(8) NALU_view_count;
    }
}
```

Multiplexer 30 and deumultiplexer 38 may instantiate a media extractor data object using the media extractor defined in the example pseudocode above. Accordingly, demultiplexer 38, for example, may refer to the instantiated media extractor when retrieving data from a selected track in order to retrieve identified data from another track referenced by the instantiated media extractor.

The techniques of this disclosure may include an assembling process for arranging the view components of samples in a sample group. The view components in the samples of the sample group entries are ordered in a timely manner such that A view component in sample A is following a view component in sample B in the media extractor track if sample A follows sample B in an original track (with index of a track reference index); a view component in sample A is following a view component in sample B in the media extractor track if the sample A has earlier decoding time than sample B; two view components in the same sample of a track are following the order of presentation in the syntax table of media extractor map sample group; two view components in the same sample of a track are following the original order if they belong to the same group of NAL unit, i.e., they are extracted by the syntax element of the same loop in the media extractor map sample group; and two view components are following the order of view order indices as specified in the view identifier box in MVC file format if they are extracted from samples in different tracks but with the same timestamp.

FIG. 22 is a block diagram illustrating an example modified 3GPP track selection box 390 to signal additional attributes for the track selection box. The most recent 3GPP standard, as of this writing, specifies an AttributeList including attributes describing language, bandwidth, codec, screen size, maximum packet size, and media type. Attribute list 392 of 3GPP track selection box 390 includes language value 394, bandwidth value 396, codec value 398, and screen size value 400, which signal these attributes in accordance with the existing 3GPP standard. In addition, techniques of this disclosure may modify the existing 3GPP track selection box to include frame rate value 406, temporal identifier value 408, and in some cases, display view number value 410 and output view list value 412.

Language value 394 defines a value of a group type LANG of an "alt-group" attribute in the session level SDP, as defined in clause 5.3.3.4 of the existing 3GPP standard. Bandwidth value 396 defines a value of a "b=AS" attribute in the media level SDP. Codec value 398 defines a SampleEntry value in the sample description box of a media track. Screen size value 400 defines the width and height fields of an MP4VisualSampleEntry value and H263SampleEntry value in a media track. Max packet size value 402 defines a value for the MaxPacketSize field in an RTPHintSampleEntry, e.g., in an RTP hint track. Media type value 404 describes a HandlerType in a Handler box of a media track. In general, these values correspond to the existing 3GPP standard.

Frame rate value 406 describes the frame rate of a video track or media extractor track corresponding to 3GPP track selection box 390. Temporal identifier value 408 corresponds to the temporal identifier of the video track corresponding to 3gPP track selection box 390, and may depend on tracks with lower temporal identifier values. In some examples, multiplexer 30 may indicate that the value of temporal identifier value 408 is not specified by setting the value to a pre-configured "not specified" value, e.g., 8. In general, multiplexer 30 may indicate that the value of temporal identifier value 408 for a non-video track is not specified. In some examples, multiplexer 30 may also indicate that the value of temporal identifier value 408 is not specified when the corresponding video track does not contain media extractors and/or is not referred to by other tracks as a temporal subset.

In examples for which MVC is considered in 3GPP, multiplexer 30 may include the additional attributes of display view number value 410 and output view list value 412. In such examples, multiplexer 30 may omit temporal identifier value 408. Display view number value 410 describes a number of views that are to be output for the corresponding track. The number of views to be output and the number of views to be decoded are not necessarily the same, e.g., when a view to be displayed is encoded with reference to a view that is not displayed. Output view list value 412 may define a list of N view identifiers that identify the N views to be output.

Figure 23:
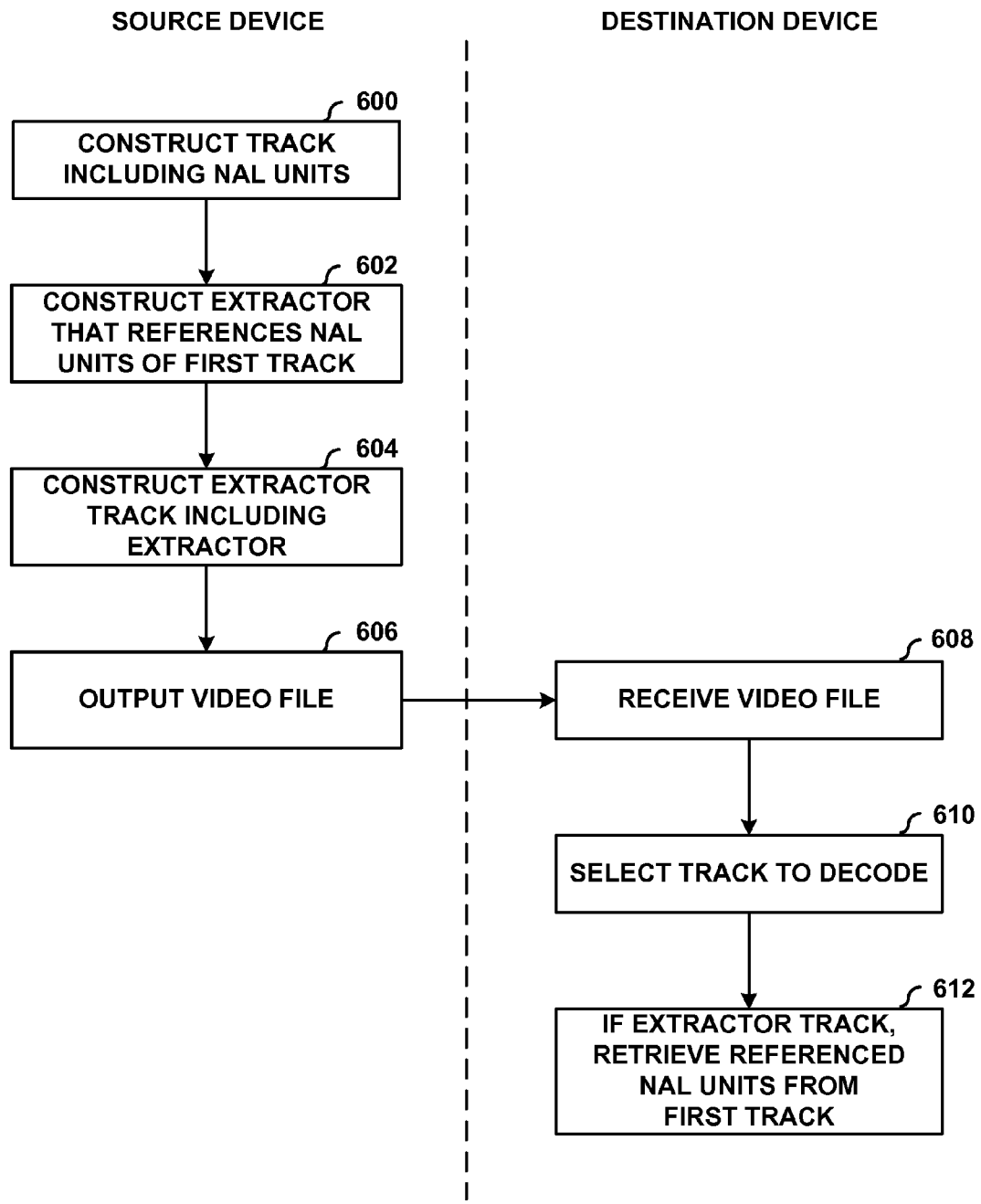
FIG. 23 is a flowchart illustrating an example method for using media extractors in accordance with the techniques of this disclosure.

FIG. 23 is a flowchart illustrating an example method for using media extractors in accordance with the techniques of this disclosure. Initially, a source device, such as A/V source device 20 (FIG. 1) constructs a video track for a file conforming to a file format in accordance with the techniques of this disclosure. That is, multiplexer 30 assembles encoded video data in the track such that the video track includes coded video samples that include one or more NAL units (600). Multiplexer 30 also constructs an extractor that references some or all of the one or more NAL units of the video track (602) and constructs an extractor track that includes the extractor (604). In addition, multiplexer 30 may include encoded video samples in the media extractor track and additional tracks including encoded video samples and/or media extractors.

Multiplexer 30 may then output the file (606). The file may be output to a signal via a transmitter, transceiver, network interface, modem, or other signal output means, or the file may be output to a storage medium via a hardware interface, such as a USB interface, magnetic media recorder, optical recorder, or other hardware interface.

A/V destination device 40 may ultimately receive the file (608), e.g., by receiving the signal or reading the storage medium. Demultiplexer 38 may select one of the two (or more) tracks to be decoded (610). Demultiplexer 38 may select one of the tracks based on decoding capabilities of video decoder 48, rendering capabilities of video output 44, or other criteria. When an extractor track is selected, demultiplexer 38 may retrieve the NAL units referenced by extractors in the extractor track from the track in which the encoded video samples identified by the extractors are stored.

Demultiplexer 38 may discard encoded video samples (or other NAL units) that are not in the selected track and are not identified by at least one extractor in the selected track. That is, demultiplexer 38 may avoid sending such encoded video samples to video decoder 48, such that video decoder 48 need not be tasked with decoding unused video data.

In one or more examples, the functions described may be implemented in hardware, software, firmware, or any combination thereof. If implemented in software, the functions may be stored on or transmitted over as one or more instructions or code on a computer-readable medium. Computer-readable media may include computer-readable storage media such as data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that a computer-readable storage medium and a data storage medium do not include connections, carrier waves, signals, or other transient media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions encoded in a computer-readable medium may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for encoding video data, the method comprising:
   constructing, by a source video device, a first track including a video sample comprising a plurality of network access layer (NAL) units based on encoded video data, wherein the video sample is included in an access unit;
   constructing, by the source video device, a second track including a plurality of extractors, the plurality of extractors including an extractor that identifies a plurality of NAL units of the first track, the identified plurality of NAL units including a first identified NAL unit of the NAL units in the video sample of the first track and a second NAL unit of the access unit, wherein the first identified NAL unit and the second identified NAL unit are non-consecutive, and wherein the extractor identifies the first NAL unit and the second NAL unit without identifying any NAL units between the first NAL unit and the second NAL unit;
   including the first track and the second track in a video file conforming at least in part to International Organization for Standardization (ISO) base media file format; and
   outputting the video file.

2. The method of claim 1, wherein the video file conforms to the ISO base media file format.

3. The method of claim 1, wherein the video file conforms to at least one of Scalable Video Coding (SVC) file format, Advanced Video Coding (AVC) file format, Third Generation Partnership Project (3GPP) file format, and Multiview Video Coding (MVC) file format.

4. The method of claim 1, wherein constructing the second track further comprises including one or more additional NAL units in the second track, based on the encoded data, that are not included in the plurality of NAL units of the first track.

5. The method of claim 4, further comprising constructing a third track including a first extractor that identifies one or more of the plurality of NAL units of the first track and a second extractor that identifies at least one of the one or more NAL units of the second track.

6. The method of claim 5, wherein constructing the third track further comprises including one or more NAL units in the third track that are not included in the first track and the second track.

7. The method of claim 1, wherein constructing the second track comprises constructing the extractor to identify each of the plurality of NAL units of the video sample of the first track, and wherein the extractor causes a destination device to extract each of the plurality of NAL units of the video sample as a whole.

8. The method of claim 1, wherein constructing the second track comprises constructing the extractor to identify the one or more of the plurality of NAL units of the video sample by specifying a byte range of the one or more of the plurality of NAL units of the video sample in the first track of the video file.

9. The method of claim 1, wherein the plurality of NAL units of the video sample in the first track comprise at least one of: slices of a common picture, non-Video Coding Layer (VCL) NAL units, Supplemental Enhancement Information (SEI) message NAL units, video layers of the access unit, different view components of the access unit, and NUL units aggregated from multiple NAL units.

10. The method of claim 1, wherein the plurality of NAL units comprises a first plurality of NAL units, the method further comprising constructing a third track including a second plurality of NAL units based on the encoded video data, wherein the second plurality of NAL units form part of the access unit, and wherein the second plurality of NAL units comprises the second identified NAL unit identified by the extractor.

11. The method of claim 1, wherein the video sample comprises a first video sample, wherein the plurality of NAL units comprises a first plurality of NAL units, wherein the first track further comprises a second sample comprising a second plurality of NAL units, wherein the access unit comprises the second sample, and wherein the second plurality of NAL units comprises the second NAL unit identified by the extractor.

12. The method of claim 1, wherein the second NAL unit comprises a second one of the plurality of NAL units of the video sample of the first track that is separated from the first identified NAL unit in the video sample by at least one byte of data.

13. The method of claim 1, wherein the first track and the second track form a switch group such that either the first track or the second track selectable for decoding by a destination device based on characteristics of each track.

14. The method of claim 13, wherein constructing the second track comprises:
   signaling a frame rate of the second track;
   signaling a temporal identifier of the video sample of the first track for the second track; and
   wherein when the second track comprises more than one view, constructing the second track further comprises:
      signaling a value representative of a number of views to be displayed after decoding the second track;
      signaling one or more view identifier values for views to be displayed for the second track; and
      signaling a value representative of a number of views to be decoded for the second track.

15. An apparatus for encoding video data, the apparatus comprising:
   an encoder configured to encode video data;
   a multiplexer configured to construct a first track including a video sample comprising a plurality of network access layer (NAL) units, based on the encoded video data, wherein the video sample is included in an access unit, construct a second track including a plurality of extractors, the plurality of extractors including an extractor that identifies a plurality of NAL units of the first track, the identified plurality of NAL units including a first identified NAL unit of the NAL units in the video sample of the first track and a second NAL unit of the access unit, wherein the first identified NAL unit and the second identified NAL unit are non-consecutive, and wherein the extractor identifies the first NAL unit and the second NAL unit without identifying any NAL units between the first NAL unit and the second NAL unit, wherein the multiplexer is further configured to include the first track and the second track in a video file conforming at least in part to International Organization for Standardization (ISO) base media file format; and an output interface configured to output the video file.

16. The apparatus of claim 15, wherein the video file conforms to at least one of ISO base media file format, Scalable Video Coding (SVC) file format, Advanced Video Coding (AVC) file format, Third Generation Partnership Project (3GPP) file format, and Multiview Video Coding (MVC) file format.

17. The apparatus of claim 15, wherein the multiplexer is configured to include one or more NAL units in the second track, based on the encoded video data, that are not included in the first track.

18. The apparatus of claim 17, wherein the multiplexer is configured to construct a third track including a first extractor that identifies one or more of the plurality of NAL units of the first track and a second extractor that identifies one or more of the plurality of NAL units of the second track.

19. The apparatus of claim 15, wherein the extractor comprises a first extractor, wherein the multiplexer is configured to construct a third extractor track including a plurality of NAL units based on the encoded video data, and wherein the multiplexer is configured to construct the second track to include a second extractor that identifies one or more of the plurality of NAL units of the third track.

20. The apparatus of claim 16, wherein the apparatus comprises at least one of:
an integrated circuit;
a microprocessor; and
a wireless communication device that includes the video encoder and the multiplexer.

21. An apparatus for encoding video data, the apparatus comprising:
means for constructing a first track including a video sample comprising a plurality of network access layer (NAL) units based on encoded video data, wherein the video sample is included in an access unit;
means for constructing a second track including a plurality of extractors, the plurality of extractors including an extractor that identifies a plurality of NAL units of the first track, the identified plurality of NAL units including a first identified NAL unit of the NAL units in the video sample of the first track and a second NAL unit of the access unit, wherein the first identified NAL unit and the second identified NAL unit are non-consecutive, and wherein the extractor identifies the first NAL unit and the second NAL unit without identifying any NAL units between the first NAL unit and the second NAL unit;
means for including the first track and the second track in a video file conforming at least in part to International Organization for Standardization (ISO) base media file format; and
means for outputting the video file.

22. The apparatus of claim 21, wherein the video file conforms to at least one of ISO base media file format, Scalable Video Coding (SVC) file format, Advanced Video Coding (AVC) file format, Third Generation Partnership Project (3GPP) file format, and Multiview Video Coding (MVC) file format.

23. The apparatus of claim 21, further comprising means for including one or more NAL units in the second track, based on the encoded data, that are not included in the first track.

24. The apparatus of claim 23, further comprising means for constructing a third track including a first extractor that identifies one or more of the plurality of NAL units of the first track and a second extractor that identifies at least one of the one or more NAL units of the second track.

25. The apparatus of claim 21, wherein the extractor comprises a first extractor, the apparatus further comprising means for constructing a third extractor track including a plurality of NAL units based on the encoded video data, and wherein the means for constructing the second track comprises means for constructing the second track to include a second extractor that identifies one or more of the plurality of NAL units of the third track.

26. A non-transitory computer-readable storage medium comprising instructions that, when executed, cause a processor to:
construct a first track including a video sample a plurality of network access layer (NAL) units based on encoded video data, wherein the video sample is included in an access unit;
construct a second track including a plurality of extractors, the plurality of extractors including an extractor that identifies a plurality of NAL units of the first track, the identified plurality of NAL units including a first identified NAL unit of the NAL units in the video sample of the first track and a second NAL unit of the access unit, wherein the first identified NAL unit and the second identified NAL unit are non-consecutive, and wherein the extractor identifies the first NAL unit and the second NAL unit without identifying any NAL units between the first NAL unit and the second NAL unit;
include the first track and the second track in a video file conforming at least in part to International Organization for Standardization (ISO) base media file format; and
output the video file.

27. The non-transitory computer-readable storage medium of claim 26, wherein the video file conforms to at least one of ISO base media file format, Scalable Video Coding (SVC) file format, Advanced Video Coding (AVC) file format, Third Generation Partnership Project (3GPP) file format, and Multiview Video Coding (MVC) file format.

28. The non-transitory computer-readable storage medium of claim 26, further comprising instructions that cause the processor to include one or more NAL units in the second track, based on the encoded data, that are not included in the first track.

29. The non-transitory computer-readable storage medium of claim 28, further comprising instructions that cause the processor to construct a third track including a first extractor that identifies one or more of the plurality of NAL units of the first track and a second extractor that identifies at least one of the one or more NAL units of the second track.

30. The non-transitory computer-readable storage medium of claim 26, wherein the extractor comprises a first extractor, the computer-readable storage medium further comprising instructions that cause the processor to construct a third extractor track including a plurality of NAL units based on the encoded video data, and wherein the instructions that cause the processor to construct the second track comprise instructions that cause the processor to construct the second track to include a second extractor that identifies one or more of the plurality of NAL units of the third track.

31. A method for decoding video data, the method comprising:

receiving, by a demultiplexer of a destination device, a video file conforming at least in part to International Organization for Standardization (ISO) base media file format, the video file comprising a first track and a second track, the first track including a video sample comprising a plurality of network access layer (NAL) units corresponding to encoded video data, wherein the video sample is included in an access unit, and the second track including a plurality of extractors, the plurality of extractors including an extractor that identifies a plurality of NAL units of the first track, the identified plurality of NAL units including a first identified NAL unit of the NAL units of the first track and a second NAL unit of the access unit, wherein the first identified NAL unit and the second identified NAL unit are non-consecutive, and wherein the extractor identifies the first NAL unit and the second NAL unit without identifying any NAL units between the first NAL unit and the second NAL unit;

selecting the second track to be decoded; and sending encoded video data of the first NAL unit and the second NAL unit identified by the extractor of the second track to a video decoder of the destination device.

32. The method of claim 31, further comprising discarding each of the plurality of NAL units of the first track that are not identified by the extractor of the second track.

33. The method of claim 31, wherein the second track further comprises one or more NAL units that are not included in the first track, the method further comprising sending encoded video data of the one or more NAL units of the second track to the video decoder.

34. The method of claim 31, wherein the video file further comprises a third track including a plurality of NAL units corresponding to encoded video data, the method further comprising sending encoded video data of the plurality of NAL units of the third track to the video decoder.

35. An apparatus for decoding video data, the apparatus comprising:

a video decoder configured to decode video data; and a demultiplexer configured to receive a video file conforming at least in part to International Organization for Standardization (ISO) base media file format, the video file comprising a first track and a second track, the first track including a video sample comprising a plurality of network access layer (NAL) units corresponding to encoded video data, wherein the video sample is included in an access unit, and the second track includes a plurality of extractors, the plurality of extractors including an extractor that identifies a plurality of NAL units of the first track, the identified plurality of NAL units including a first identified NAL unit of the NAL units of the first track and second NAL unit of the access unit, wherein the first identified NAL unit and the second identified NAL unit are non-consecutive, and wherein the extractor identifies the first NAL unit and the second NAL unit without identifying any NAL units between the first NAL unit and the second NAL unit, wherein the demultiplexer is further configured to select the second track to be decoded, and send encoded video data of the first NAL unit and the second NAL unit identified by the extractor of the second track to the video decoder.

36. The apparatus of claim 35, wherein the demultiplexer is configured to discard each of the plurality of NAL units of the first track that are not identified by the extractor of the second track.

37. The apparatus of claim 35, wherein the second track further comprises one or more NAL units that are not included in the first track, and wherein the demultiplexer is configured to send encoded video data of the one or more NAL units of the second track to the video decoder.

38. The apparatus of claim 35, wherein the video file further comprises a third track including a plurality of NAL units corresponding to encoded video data, and wherein the demultiplexer is configured to send encoded video data of the plurality of NAL units of the third track to the video decoder.

39. An apparatus for decoding video data, the apparatus comprising:

means for receiving a video file conforming at least in part to International Organization for Standardization (ISO) base media file format, the video file comprising a first track and a second track, the first track including video sample comprising a plurality of network access layer (NAL) units corresponding to encoded video data, wherein the video sample is included in an access unit, and the second track including a plurality of extractors, the plurality of extractors including an extractor that identifies a plurality of NAL units of the first track, the identified plurality of NAL units including a first identified NAL unit of the NAL units of the first track and a second NAL unit of the access unit, wherein the first identified NAL unit and the second identified NAL unit are non-consecutive, and wherein the extractor identifies the first NAL unit and the second NAL unit without identifying any NAL units between the first NAL unit and the second NAL unit;

means for selecting the second track to be decoded; and means for sending encoded video data of the first NAL unit and the second NAL unit identified by the extractor of the second track to a video decoder of the apparatus.

40. The apparatus of claim 39, further comprising means for discarding each of the plurality of NAL units of the first track that are not identified by the extractor of the second track.

41. The apparatus of claim 39, wherein the second track further comprises one or more NAL units that are not included in the first track, the apparatus further comprising means for sending encoded video data of the one or more NAL units of the second track to the video decoder.

42. The apparatus of claim 39, wherein the video file further comprises a third track including a plurality of NAL units corresponding to encoded video data, the apparatus further comprising means for sending encoded video data of the plurality of NAL units of the third track to the video decoder.

43. A non-transitory computer-readable storage medium comprising instructions that, when executed, cause a processor to:

upon receiving a video file conforming at least in part to International Organization for Standardization (ISO) base media file format, the video file comprising a first track and a second track, the first track including a video sample comprising a plurality of network access layer (NAL) units corresponding to encoded video data, wherein the video sample is included in an access unit, and the second track including a plurality of extractors, the plurality of extractors including an extractor that identifies a plurality of NAL units of the first track, the identified plurality of NAL units including a first identified NAL unit of the NAL units of the first track and a second NAL unit of the access unit, wherein the first identified NAL unit and the second identified NAL unit are non-consecutive, and wherein the extractor identifies the first NAL unit and the second NAL unit without identifying any NAL units between the first NAL unit and the second NAL unit, select the second track to be decoded; and send encoded video data of the first NAL unit and the second NAL unit identified by the extractor of the second track to a video decoder.

44. The non-transitory computer-readable storage medium of claim 43, further comprising discarding each of the plurality of NAL units of the first track that are not identified by the extractor of the second track.

45. The non-transitory computer-readable storage medium of claim 43, wherein the second track further comprises one or more NAL units that are not included in the first track, the method further comprising sending encoded video data of the one or more NAL units of the second track to the video decoder.

46. The non-transitory computer-readable storage medium of claim 43, wherein the video file further comprises a third track including a plurality of NAL units corresponding to encoded video data, the method further comprising sending encoded video data of the plurality of NAL units of the third track to the video decoder.

* * * * *